(12) United States Patent
Miyazaki et al.

(10) Patent No.: US 6,532,091 B1
(45) Date of Patent: Mar. 11, 2003

(54) OPTICAL DIGITAL REGENERATOR

(75) Inventors: Tetsuya Miyazaki, Tokyo (JP);
Tomohiro Otani, Tokyo (JP);
Masatoshi Suzuki, Tokyo (JP); Noboru Edagawa, Tokyo (JP); Shu Yamamoto, Tokyo (JP)

(73) Assignee: KDD Corporation, Tokyo (JP)

( * ) Notice: Subject to any disclaimer, the term of this patent is extended or adjusted under 35 U.S.C. 154(b) by 0 days.

(21) Appl. No.: 09/246,256

(22) Filed: Feb. 8, 1999

(30) Foreign Application Priority Data

Mar. 6, 1998 (JP) .......................... 10-054663
Dec. 15, 1998 (JP) .......................... 10-356642
Jan. 19, 1999 (JP) .......................... 11-010121

(51) Int. Cl.$^7$ ............................................. H04B 10/02
(52) U.S. Cl. ................. 359/176; 359/177; 359/158; 359/237; 359/326; 359/344; 385/24
(58) Field of Search ................ 359/176, 174, 359/179, 177, 158, 127, 130, 124, 333, 332, 344, 326, 237, 322; 385/24, 1, 15, 27, 122, 42

(56) References Cited

U.S. PATENT DOCUMENTS

| 5,781,326 A | * | 7/1998 | Chiaroni et al. | 359/237 |
| 5,940,207 A | * | 8/1999 | Weich et al. | 359/333 |
| 5,959,764 A | * | 9/1999 | Edagawa et al. | 359/326 |
| 6,259,552 B1 | * | 7/2001 | Boffi et al. | 359/332 |
| 6,335,819 B1 | * | 1/2002 | Cho et al. | 359/333 |
| 6,377,388 B1 | * | 4/2002 | Sakata et al. | 359/321 |

OTHER PUBLICATIONS

B. Lavigne, et al. *Experimental Analysis of SOA–based 2R and 3R Optical Regeneration for Future WDM Networks*, OFC '98, Technical Digest, pp. 324–325, Feb. 1997.
Terju Durhuus, et al. *All–Optical Wavelength Conversion by Semiconductor Optical Amplifiers*, Journal of Lightwave Technology, vol. 14, No. 6, pp. 942–954, Jun. 1996.
K.S. Jepsen, et al. *All–Optical Network Interface for Bit Synchronisation and Regeneration*, ECOC 97, Sep. 22–25, 1997, Conference Publication No. 448, pp. 89–92, © IEE, 1997.
Edagawa, et al., OFC '97, TuO 5, pp. 77–78, 1997 (on order).

* cited by examiner

*Primary Examiner*—Leslie Pascal
*Assistant Examiner*—Hanh Phan
(74) *Attorney, Agent, or Firm*—Christie, Parker & Hale, LLP

(57) ABSTRACT

An optical digital regenerator for digitally regenerating an input signal in an intact optical state. A first operating unit has a first probe light generator for generating a first probe light and a first optical operator for converting a waveform of the first probe light output from a first probe light generator according to an optical intensity waveform of the input signal light. A clock extractor extracts a clock component of the input signal light from a photocurrent generated by the first optical operator. A second optical operating unit has a second probe light generator for generating a second probe light pulsed in accordance with the clock output from the clock extractor and a second optical operator for sampling the second probe pulse light output from the second probe light generator.

31 Claims, 19 Drawing Sheets

Fig. 15(A) Input optical signal
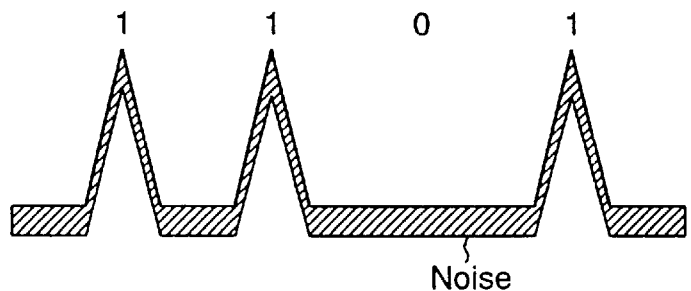
Fig. 15(B) Optical gate
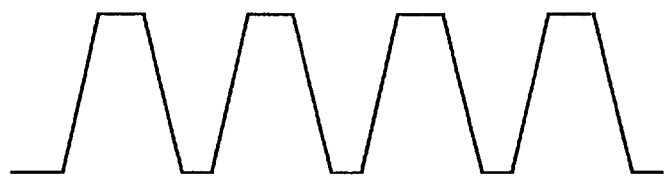
Fig. 15(C) Optical gate output
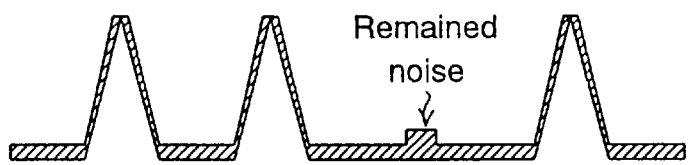
Fig. 16
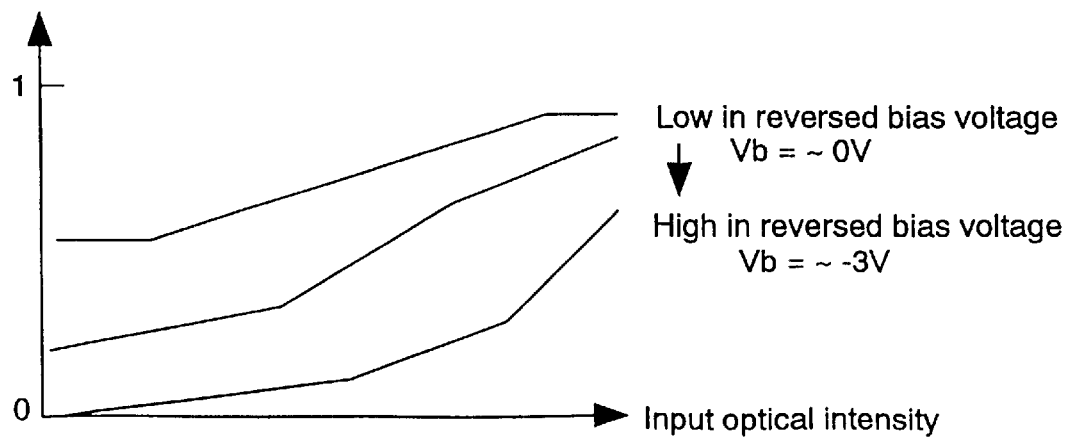

OPTICAL DIGITAL REGENERATOR

FIELD OF THE INVENTION

The present invention relates to an optical digital regenerator, and more specifically, to an apparatus for regenerating an optical signal in an intact optical state.

BACKGROUND OF THE INVENTION

As an optical cross-connect node on a large capacity wavelength-division multiplexing optical network in the future, due to the increase of a bit rate per wavelength as well as the increase of the number of multiplexed wavelengths, an optical digital regenerating system for regenerating information as intact optical signals has been widely noticed instead of a system in which optical signals are electrically terminated per wavelength and regeneratively repeated.

In a WDM optical network in which an usable wavelength is assigned to each line in advance, it is necessary that an input wavelength and an output wavelength of an optical digital regenerator are the same. However, in a WDM optical network that positively adopts the wavelength conversion, reusing the wavelengths can reduce the number of wavelengths. In this case, an input wavelength and an output wavelength of an optical digital regenerator are not necessarily the same. Accordingly, conventional optical digital regenerators have employed a structure that comprises two-step wavelength converting parts so as to be widely applicable to any optical network.

A schematic block diagram of a conventional optical digital regenerator is shown in FIG. 4. A signal light from a trunk line system enters an input terminal 10. The signal light (wavelength $\lambda i$) having input the input terminal 10 is divided by an optical coupler 12 and enters a high-speed photodiode 14. The photodiode 14 converts the signal light into an electric signal and applies it to a clock extracting circuit 16. The clock extracting circuit 16 extracts a clock component of the signal light from the output of the photodiode 14.

The input signal light (wavelength $\lambda i$) of the input terminal 10 also enters a wavelength converter 18. The wavelength converter 18 converts the signal light input from the input terminal 10 into another wavelength $\lambda j$. The signal light whose wavelength have been converted into $\lambda j$ by the wavelength converter 18 inputs a second wavelength converter 20. The wavelength converter 20 comprises a clock input terminal besides an optical input terminal to which the output light of the wavelength converter 18 enters. The clock extracted by the clock extracting circuit 16 inputs the clock input terminal after being amplified by an amplifier 20 and phase-shifted (adjusted) by a phase shifter 24. The wavelength converter 20 superimposes the signal light of the wavelength $\lambda j$ from the wavelength converter 18 on a waveform of an RZ probe pulsed light of wavelength $\lambda k$ formed from the clock input through the clock input terminal. By this operation, the wavelength of the signal light is converted from the wavelength $\lambda j$ into the wavelength $\lambda k$ and at the same time the signal light is retimed and waveform-reshaped.

There are conventional structures in which retiming and waveform-reshaping is performed at a first wavelength converter using extracted clocks (for example, see B. Lavigne et al. 'Experimental analysis of SOA-based 2R and 3R optical regeneration for future WDM networks', OFC '98, Technical Digest, pp. 324–325, which was published at The Optical Fiber Conference held in February in 1998.). FIG. 5 shows a schematic block diagram of the conventional embodiment.

An input signal light (NRZ optical pulse) of wavelength $\lambda 0$ from a trunk line system enters an input terminal 110. The signal light (wavelength $\lambda 0$) entered the input terminal 110 is divided by an optical coupler 112 and then inputs a clock regenerating circuit 114. The clock regenerating circuit 114, which comprises a high-speed photodiode, converts the optical pulse from the optical coupler 112 into an electric signal and electrically extracts a clock component contained in the signal light. An LD driving circuit 116 pulse-drives DFB lasers 118 and 120 in accordance with the clock regenerated by the clock regenerating circuit 114. The DFB lasers 118 and 120 respectively laser-oscillate at mutually different wavelengths $\lambda 1$ and $\lambda 2$ and output pulse lights (probe pulse lights) locked with the regenerated clock from the clock regenerating circuit 114. The probe pulse lights from the DFB lasers 118 and 120 are combined by a multiplexer 122 and then input one facet of a semiconductor optical amplifier (SOA) 124.

The signal light (wavelength $\lambda 0$) having input the input terminal 110 also enters a port A of an optical circulator 126 and outputs from its port B. The input signal light from the port B enters the other facet of the SOA 124. While the signal light of the wavelength $\lambda 0$ and the probe pulse lights of the wavelengths $\lambda 1$ and $\lambda 2$ propagate mutually in the opposite directions in the SOA 124, a pulse waveform or bit information of the signal light is copied to the probe pulsed light due to the cross gain modulation effect. That is, the probe pulse light being output from the SOA 124 toward the port B of the optical circulator 126 becomes an RZ pulse conveying the same bit information with the input signal light (wavelength $\lambda 0$) of the input terminal 110.

The probe pulse light (wavelength $\lambda 1+\lambda 2$) having output from the SOA 124 enters the port B of the optical circulator 126 and outputs from its port C to be divided into a wavelength $\lambda 1$ component and a wavelength $\lambda 2$ component by a wavelength demultiplexing element 128. The respective components of the wavelengths $\lambda 1$ and $\lambda 2$ demultiplexed by the wavelength demultiplexing element 128 propagate on different optical paths 130a and 130b and then multiplexed by a multiplexer 132. The optical paths 130a and 130b are for example predetermined so that the propagation time of the wavelength $\lambda 2$ component is delayed by one half bit period in comparison with that of the wavelength $\lambda 1$ component. Therefore, the pulse light becomes an NRZ optical pulse after being multiplexed by the multiplexer 132.

The output light of the multiplexer 132 inputs a first port of a first facet of a Mach-Zehnder interferometer (MZI) type wavelength converter 134 and led to one optical path in the MZI wavelength converter 134. The CW laser light from a DFB laser 136 inputs a second facet of the MZI wavelength converter 134. The oscillating wavelength $\lambda i$ of the DFB laser 136 is different from both of the oscillating wavelengths $\lambda 1$ and $\lambda 2$ of the DFB lasers 118 and 120. The output light of the DFB laser 136 is divided in the MZI wavelength converter 134. The divided lights propagate on the two optical paths and combined together again in the MZI wavelength converter 134. The combined light then outputs from a second port of the first facet of the MZI wavelength converter 134. On the one optical path in the MZI wavelength converter 134, the output light of the multiplexer 132 propagates in the opposite direction. The MZI wavelength converter 134 converts the pulse signal of wavelength $\lambda 1+\lambda 2$ into the wavelength $\lambda i$. The waveforms are respectively reversed in the SOA 124 and the MZI wavelength converter 134 and nonreversing regenerated optical signal waveforms are obtained as final outputs. The purpose of the wavelength conversion in the MZI wavelength converter 134 is mainly to improve the extinction ratio.

An optical band pass filter 138 extracts the wavelength $\lambda i$ components alone from the output light of the second port of the first facet of the MZI wavelength converter 134. It is for preventing the mixing of lights of the wavelengths $\lambda 0$, $\lambda 1$ and $\lambda 2$ due to the reflection at each part.

In the conventional structure shown in FIG. 4, the optical coupler 12, the high-speed photodiode 14, and the clock extracting circuit 16 are indispensable for extracting the clock components. When optical digital regeneration is performed for each wavelength, the required number of the optical couplers 12 and the photodiodes 14 to be disposed on the node are equal to the number of the wavelengths resulting the increase in costs and the decrease in reliability.

In the conventional structure shown in FIG. 5, two probe light sources are necessary at the first wavelength conversion and it also reduces the reliability and increases the costs. Also, a wavelength demultiplexing element 128 is needed for dividing two wavelengths $\lambda 1$ and $\lambda 2$ causing the increase of the costs. Since the oscillating wavelength of DFB lasers 118 and 120 has to coincide with the wavelength dividing characteristics of the wavelength demultiplexing element 128 over a long term, it requires a highly advanced wavelength stabilization technique.

SUMMARY OF THE INVENTION

An object of the present invention is to solve the above-mentioned problems and to provide an optical digital regenerator for more reliably regenerating an optical pulse signal in an intact optical state.

Another object of the present invention is to provide an optical digital regenerator that requires no high-speed photodiode contributing to the high reliability and the low costs.

An optical digital regenerator according to the present invention is an optical digital regenerator for regenerating an input signal light in a intact optical state, comprising a first optical operating unit having a first probe light generator for generating a first probe light and a first optical operator for converting the waveform of the first probe light output from the first probe light generator in accordance with an optical intensity waveform of the input signal light; a clock extractor for extracting a clock component of the input signal light from a photocurrent generated from the first optical operator; and a second optical operating unit having a second probe light generator for generating a second probe light being pulsed in accordance with the clock output from the clock extractor and a second optical operator for sampling the second probe pulse light output from the second probe light generator according to the first probe light from the first optical operating unit.

Since the clock of the input signal light is extracted from the first optical operator of the first optical operating unit, high-speed photodiodes for extracting clocks and optical couplers for dividing a signal light become unnecessary. Accordingly, the optical elements can be reduced and, as a result, the reliability improves and the costs reduce. In the second optical operating unit, the signal light can get retiming and reshaping by operating the waveform of the probe pulse light formed from the extracted clock with the waveform of the output light of the first optical operating unit.

Assuming that the probe light generated from the first probe light generator is a CW light, the clock extraction becomes easier. The first optical operator comprises for example an EA modulator applied by a predetermined DC bias.

The clock extractor comprises a phase adjuster for adjusting the phase of the extracted clock. Therefore, the retiming and reshaping can be performed in appropriate timing at the optical operation, namely the wavelength conversion in the second optical operating unit.

On the assumption that a first extractor is disposed in the first optical operating unit, which first extractor extracts the probe light operated by the first optical operator and a second extractor is disposed in the second optical operating unit, which second extractor extracts the probe light operated by the second optical operator, even if the signal light and the probe light enter for example from the opposite directions in the respective first and second optical operators, the waveform-operated probe light can be efficiently extracted separately from the signal light. That is, the disposition of respective elements becomes simpler.

When the wavelength $\lambda j$ of the probe light generated from the first probe light generator is different from the wavelength $\lambda i$ of the input signal light, the problem of interference and crosstalk can be reduced or solved.

When the wavelength $\lambda k$ of the probe light generated from the second probe light generator is different from the wavelength $\lambda j$ of the probe light generated from the first probe light generator, here again, the problem of interference and crosstalk can be reduced or solved.

By providing an optical pulse stretcher for stretching the pulse width of the optical pulse output from the first optical operating unit, it becomes resistant to the jitter of the input signal light and, thus, the signal light pulse of accurate timing can be obtained in the second optical operating unit. The optical pulse stretcher comprises for example a means for dividing an input light into two and combining them after the divided lights have propagated on different optical paths. The optical pulse stretcher comprises a high dispersion medium. The optical pulse stretcher can also comprises a chirped grating fiber and an optical circulator for supplying the input light to the chirped grating fiber and outputting the reflected light from the chirped grating fiber to the outside. The employment of these passive elements assures the stable operation over a long time and, therefore, a highly reliable 3R regenerator can be realized. In the first optical operating unit, probe light generators for two wavelengths are unnecessary. This also contributes to the improvement of reliability.

The size of the optical pulse stretcher using the high dispersion medium or the chirped fiber grating can be reduced by providing a phase modulator in the first optical operating unit for modulating the phase of the first probe light output from the first probe light generator in accordance with the clock extracted by the clock extractor. The high dispersion medium comprises for example a high dispersion fiber and its length can be reduced extremely, that is, by half.

When the above optical pulse stretcher is employed, it is possible to prevent a bad influence of interference and to improve the stretching effect of the optical pulse by employing at least one of an incoherent light generator and a multi-wavelength light generator as the first probe light generator.

The optical pulse stretcher also can comprise media having different propagation characteristics in mutually orthogonal polarization directions. Although the optical path between the first probe light generator and the optical pulse stretcher need to be a polarization preserving type, the optical pulse can be stretched with a very simple structure.

Furthermore, by providing an optical gate apparatus, between the output of the first optical operating unit and the input of the second optical operating unit, for optically gating the output light of the first optical operating unit in accordance with the clock output from the clock extractor, the extinction ratio can be improved. Using the optical gate apparatus and the above-described optical pulse stretcher together, the probability of failure at sampling in the second optical operating unit is reduced.

When the optical gate apparatus comprises a phase controller for automatically adjusting the phase of the clock output from the clock extractor, the optical gate function of the optical gate apparatus can be followed by the jitter of the input signal light. This operation increases the resistance to the jitter.

BRIEF DESCRIPTION OF THE DRAWING

FIG. 15(A) is a diagram showing waveform of an input optical signal of an optical gate apparatus 270;

FIG. 15(B) is a diagram showing the optical gate characteristics by the MZ optical intensity modulator 274;

FIG. 15(C) is a diagram showing an output waveform of the optical gate apparatus 270;

FIG. 16 shows the absorption loss characteristics of an EA optical modulator against a bias voltage (a reverse bias voltage);

DESCRIPTION OF THE PREFERRED EMBODIMENTS

Embodiments of the invention are explained below in detail with reference to the drawings.

Figure 1:
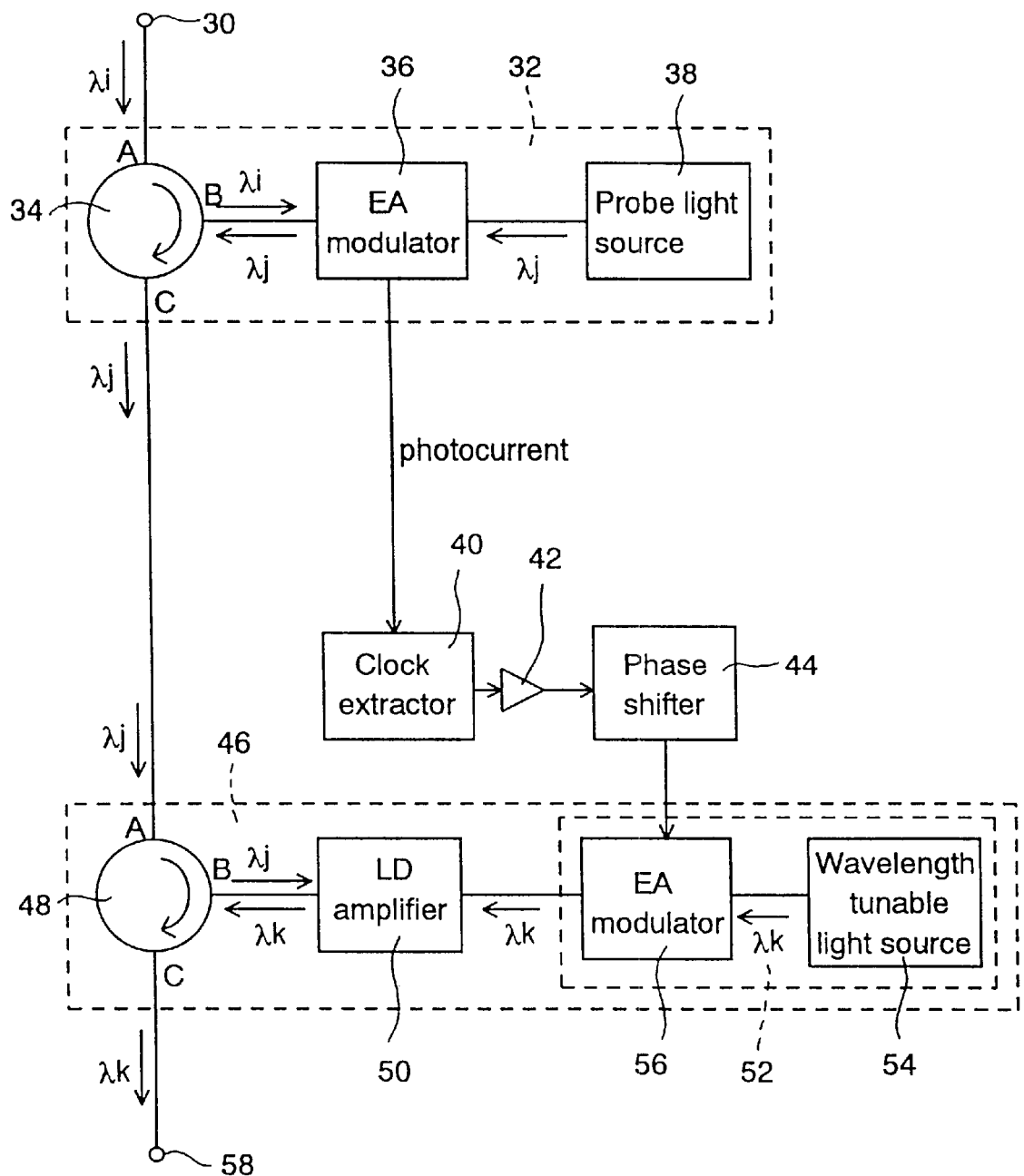
FIG. 1 is a schematic block diagram of a first embodiment of this invention.

FIG. 1 shows a schematic block diagram of an embodiment of this invention. Numeral 30 denotes an optical input terminal in which a signal light (wavelength $\lambda i$) from a trunk line system enters. The signal light (wavelength $\lambda i$) from the optical input terminal 30 inputs a wavelength converter 32. The wavelength converter 32 comprises an optical circulator 34 having three ports of A, B and C in which the input light of the port A is sent to the port B and the input light of the port B is sent to the port C, an electroabsorption (EA) type optical modulator 36 biased by a constant DC voltage and a probe light source 38 for generating a CW probe light of the wavelength $\lambda j$ different from the wavelength $\lambda i$.

The signal light (wavelength $\lambda i$) from the optical input terminal 30 inputs the port A of the optical circulator 34 and the port B of the optical circulator 34 optically couples with one facet of the EA modulator 36 while the probe light (wavelength $\lambda j$) from the probe light source 38 inputs the other facet of the EA modulator 36. The output light of the port C of the optical circulator 34 becomes the wavelength-converted output of the wavelength converter 32. The detailed explanation of such wavelength converter 32 is described in the specification and drawings (especially in FIG. 1) of Heisei 8 nen (1996) Japanese Patent Application No. 233796.

At an electrode of the EA modulator 36, a photocurrent according to the intensity change of the input light (the signal light of the wavelength $\lambda i$ from the port B of the optical circulator) is generated. The generated photocurrent is applied to a clock extracting circuit 40 and the clock extracting circuit 40 extracts clock components from the input photocurrent and outputs electrical clock signals.

The clock extracted by the clock extracting circuit 40 is applied to a second wavelength converter 46 after being amplified by an amplifier 42 and phase-shifted (phase-adjusted) by a phase shifter 44.

The signal light of wavelength $\lambda j$ from (the port C of the optical circulator 34 of) the wavelength converter 32 inputs the second wavelength converter 46. The wavelength converter 46 comprises an optical circulator 48, similarly to the optical circulator 34, having three ports of A, B and C, a semiconductor laser amplifier 50 and a probe light source 52 for generating probe pulse light (wavelength $\lambda k$) whose phase and frequency are adjusted for wavelength conversion at the semiconductor laser amplifier 50. The probe light source 52 comprises for example a wavelength tunable light source 54 for discretely changing an oscillating wavelength and an optical modulator 56 for intensity-modulating an output laser light from the wavelength tunable light source 54. A signal, which is obtained by amplifying a clock output from the clock extracting circuit 40 using the amplifier 40 and then phase-shifting (phase-adjusting) with the phase shifter 44, is applied to the optical modulator 56 as a modulating signal.

The semiconductor laser amplifier 50 operates as a wavelength converting element similarly to the EA modulator 36 of the wavelength converter 32. It is obvious from the previously mentioned Heisei 8 nen (1996) Japanese Patent Application No. 233796 that an EA modulator can be used instead of the semiconductor laser amplifier 50. Since there is no need for extracting the clock components anymore in the wavelength modulator 46, the semiconductor laser amplifier 50 is employed. A wavelength converting element can be used as a substitute for the semiconductor laser amplifier 50, which uses the cross phase modulation effect described in Journal of Lightwave Technology, vol. 14, No. 6, pp. 942–954, 1996.

The signal light (wavelength $\lambda j$) from the wavelength converter 32 inputs the port A of the optical circulator 48 and enters one facet of the semiconductor laser amplifier 50 after being output from the port B of the optical circulator 48. At the probe light source 52, the wavelength tunable light source 54 generates a CW light of wavelength $\lambda k$. The wavelength $\lambda k$ can be discretely changed and also $\lambda k$ can be equal to $\lambda i$. As previously explained, since the clock output from the clock extracting circuit 40 is applied to the electrode of the EA modulator 56 through the amplifier 42 and the phase shifter 44, the EA modulator 56 intensity-modulates the output light of the wavelength tunable light source 54 into an RZ waveform according to the clock output from the clock extracting circuit 40. The output light (wavelength $\lambda k$) of the probe light source 52 inputs the other facet of the semiconductor laser amplifier 50, then enters the port B of the optical circulator 48 after being superimposed by the signal light waveform of wavelength $\lambda j$ at the semiconductor laser amplifier 50 and finally outputs from the port C of the optical circulator 48. The output light of the port C of the optical circulator 48 becomes the wavelength conversion output of the wavelength converter 46 and outputs from an optical output terminal 58 toward the outside (the trunk line system).

A method is also applicable in which the RZ probe light is generated using the gain switching effect in accordance with a clock as described in ECOC (European Conference of Optical Communication) '97, 22–25, September. '97 Conference Publication No. 448, Post dead line papers pp. 89–92 by employing a semiconductor laser diode capable of high-speed modulation in place of the EA modulator 56 and wavelength tunable light source 54.

The operation of the embodiment is explained below. The signal light (wavelength $\lambda i$) inputs the wavelength converter 32 from the optical input terminal 30. The signal light (wavelength $\lambda i$) entered the wavelength converter 32 is propagated from the port A to the port B of the optical circulator 34 and enters one facet of the EA modulator 36. A CW probe light (wavelength $\lambda j$) output from the probe light source 38 inputs the other facet of the EA modulator 36. While the signal light of wavelength $\lambda i$ and the CW probe light of wavelength $\lambda j$ transmit in mutually opposite directions in the EA modulator 36, the waveform of the signal light (wavelength $\lambda i$) is copied onto the probe light (wavelength $\lambda j$) as described in Heisei 8 nen (1996) Japanese Patent Application No. 233796. As a result, the probe light (wavelength $\lambda j$) inputs the port B of the optical circulator 34, which probe light has substantially the same information with the signal light (wavelength $\lambda i$) input to the wavelength converter 32.

The signal light wavelength-converted to the wavelength $\lambda j$ by the EA modulator 36, namely the probe light having transmitted the EA modulator 36, enters the port B of the optical circulator 34 and outputs to the second wavelength converter 46 from the port C. Consequently, the wavelength of the signal light is converted from $\lambda i$ to $\lambda j$ by the wavelength converter 32.

At an electrode of the EA modulator 36, a photocurrent is generated, which changes in accordance with the intensity fluctuation of the input light. Since the intensity fluctuating input light is the signal light (wavelength $\lambda i$) from the port B of the optical circulator 34, the generated photocurrent has the clock component of the signal light (wavelength $\lambda i$) entering the optical input terminal 30. The clock extracting circuit 40 extracts the clock component from the photocurrent. The clock extracted by the clock extracting circuit 40 is amplified by the amplifier 42, phase-shifted (phase-adjusted) by the phase shifter 44 and then applied to an electrode of an EA modulator 56 of a probe light source 52 in the wavelength converter 46 for retiming and waveform-reshaping by the wavelength converter 46. The photocurrent is used for extracting the clock, and, therefore, the optical coupler 12 and the high-speed photodiode 14 used in the conventional apparatus become unnecessary.

The wavelength converter 46 converts the wavelength of the signal light from $\lambda j$ to $\lambda k$ using basically the same operation with the wavelength converter 32. The wavelength $\lambda k$ can be either equal or not equal to the wavelength $\lambda i$ of the signal light input to the optical input terminal 30.

The signal light (wavelength $\lambda j$) input the wavelength converter 46 is transmitted from the port A to the port B of the optical circulator 48 and enters one facet of a semiconductor laser amplifier 50. In the probe light source 52, the wavelength tunable light source 54 generates a CW light of wavelength $\lambda k$ and applies it to the EA modulator 56. The signal light in which the output clock of the clock extracting circuit 40 is amplified by the amplifier 42 and phase-adjusted by the phase shifter 44 is applied as modulation signal to the EA modulator 56. The EA modulator 56 generates a probe pulse light by intensity-modulating the CW probe light from the wavelength tunable light source 54 according to the modulation signal. The generated probe pulse light (wavelength $\lambda k$) inputs to the other facet of the semiconductor laser amplifier 50.

In the semiconductor laser amplifier 50, while the signal light of wavelength $\lambda j$ from the optical circulator 48 and the probe pulse light of wavelength $\lambda k$ from the probe light source 52 propagate in mutually opposite directions, a waveform of the signal light (wavelength $\lambda j$) is copied or overlapped on the probe light (wavelength $\lambda k$) by the same operation with the EA modulator 36 of the wavelength converter 32. In consequence, the probe light (wavelength $\lambda k$) enters the port B of the optical circulator 48 and outputs from the port C of the optical output terminal 58, which probe light has basically the same information with the signal light (wavelength $\lambda j$) that inputs the wavelength converter 46. That is, the signal light of the wavelength $\lambda k$ is output from the optical input terminal 58 to the outside (the trunk line system).

In the wavelength converter 46, the probe light generated from the probe light source 52 is pulsed at the same repetitive frequency with that of the clock of the signal light (wavelength $\lambda i$) being input to the optical input terminal 30. Therefore, the semiconductor laser amplifier 50 performs retiming and waveform-reshaping simultaneously with wavelength conversion.

Figure 2:
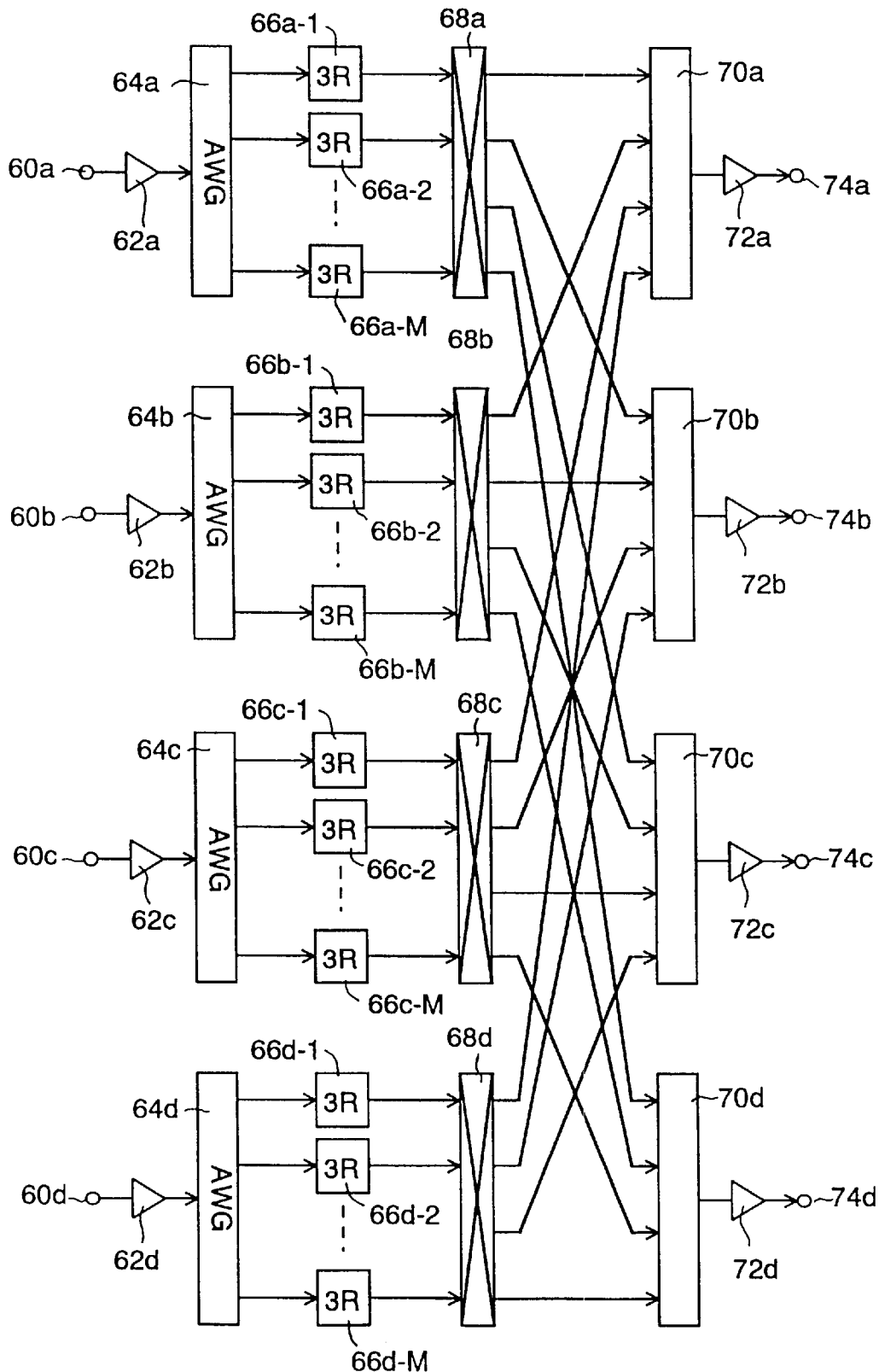
FIG. 2 is a schematic block diagram of an optical cross-connect equipment employing the embodiment.

By employing this embodiment for example as an optical crossconnect equipment, a choice of courses becomes more flexible. FIG. 2 shows a schematic block diagram of the optical crossconnect node.

Numerals 60a, 60b, 60c and 60d denote optical input terminals in which wavelength division multiplexed lights enter from respectively different optical transmission lines.

On the assumption that the input lights of the optical input terminals 60a~60d are wavelength division multiplexed lights comprising M wavelengths (M is, for example, 16 or 32). Numerals 62a, 62b, 62c and 62d denote optical amplifiers for amplifying the wavelength multiplexed lights from the optical input terminals 60a~60d. Numerals 64a, 64b, 64c and 64d denote wavelength demultiplexing elements (in the concrete, 1×M arrayed waveguide gratings) for demultiplexing the respective output lights of the optical amplifiers 62a~62d into individual wavelengths. The outputs of the individual wavelengths of the wavelength demultiplexing element 64a connect to the respective inputs of an M×4 optical switch 68a through all-light signal generators 66a-1~66a-M, which have a configuration shown in FIG. 1. The outputs of the respective wavelengths of the wavelength demultiplexing elements 64b, 64c and 64d also connect the respective inputs of the M×4 optical switches 68b, 68c and 68d through all-light signal generators 66b-1~66b-M, 66c-1~66b-M and 66d-1~66d-M having the configuration shown in FIG. 1.

The respective four outputs of the M×4 optical switch 68a connect first inputs of 4×1 optical couplers 70a, 70b, 70c and 70d, the respective four outputs of the M×4 optical switch 68b connect second inputs of the 4×1 optical couplers 70a~70d, the respective four outputs of the M×4 optical switch 68c connect third inputs of the 4×1 optical couplers 70a~70d and the respective four outputs of the M×4 optical switch 68d connect fourth inputs of the 4×1 optical couplers 70a~70d.

The outputs of the 4×1 optical couplers 70a~70d respectively connect optical output terminals 74a~74d through optical amplifiers 72a~72d. The respective optical output terminals 74a~74d connect mutually different optical transmission lines.

The operation of the crossconnect equipment depicted in FIG. 2 will be explained below. The input wavelength multiplexed lights of the input terminals 60a~60d are respectively amplified by the optical amplifiers 62a~62d, input the wavelength demultiplexing elements 64a~64d and demultiplexed into individual signal wavelengths. The signal lights of the individual wavelengths output from the wavelength demultiplexing elements 64a~64d connect to the respective inputs of the M×4 optical switches 68a~68d after getting retiming, waveform-reshaping and, if necessary, wavelength-converting by the all-light signal regenerators 66a-1~66a-M, 66b-1~66b-M, 66c-1~66c-M and 66d-1~66d-M having the configuration shown in FIG. 1.

The M×4 optical switches 68a~68d can distribute the M input lights at a desired combination to four output ports. The output lights of the first outputs of the M×4 optical switches 68a~68d are combined (wavelength division multiplexed) by a 4×1 optical coupler 70a, the output lights of the second output ports of the M×4 optical switches 68a~68 are combined (wavelength division multiplexed) by a 4×1 optical coupler 70b, the output lights of the third output ports of the M×4 optical switches 68a~68 are combined (wavelength division multiplexed) by a 4×1 optical coupler 70c and the output lights of the fourth output ports of the M×4 optical switches 68a~68 are combined (wavelength division multiplexed) by a 4×1 optical coupler 70d. The respective combined output lights of the optical couplers 70a~70d are optically amplified by the optical amplifiers 72a~72d and output to the outside from output terminals 74a~74d.

The individual wavelengths after the separation of the wavelengths are, if necessary, wavelength-converted by the all-light signal regenerators 66a~1-M, 66b-1~M, 66c-1~M and 66d-1~M, and selected their output destinations by the M×4 optical switches 68a~68d. Therefore, at joints of a plurality of ring networks, the transmission of light signals beyond the rings can be realized and, furthermore, the selection of courses in accordance with events such as a breakage also becomes possible.

Figure 3:
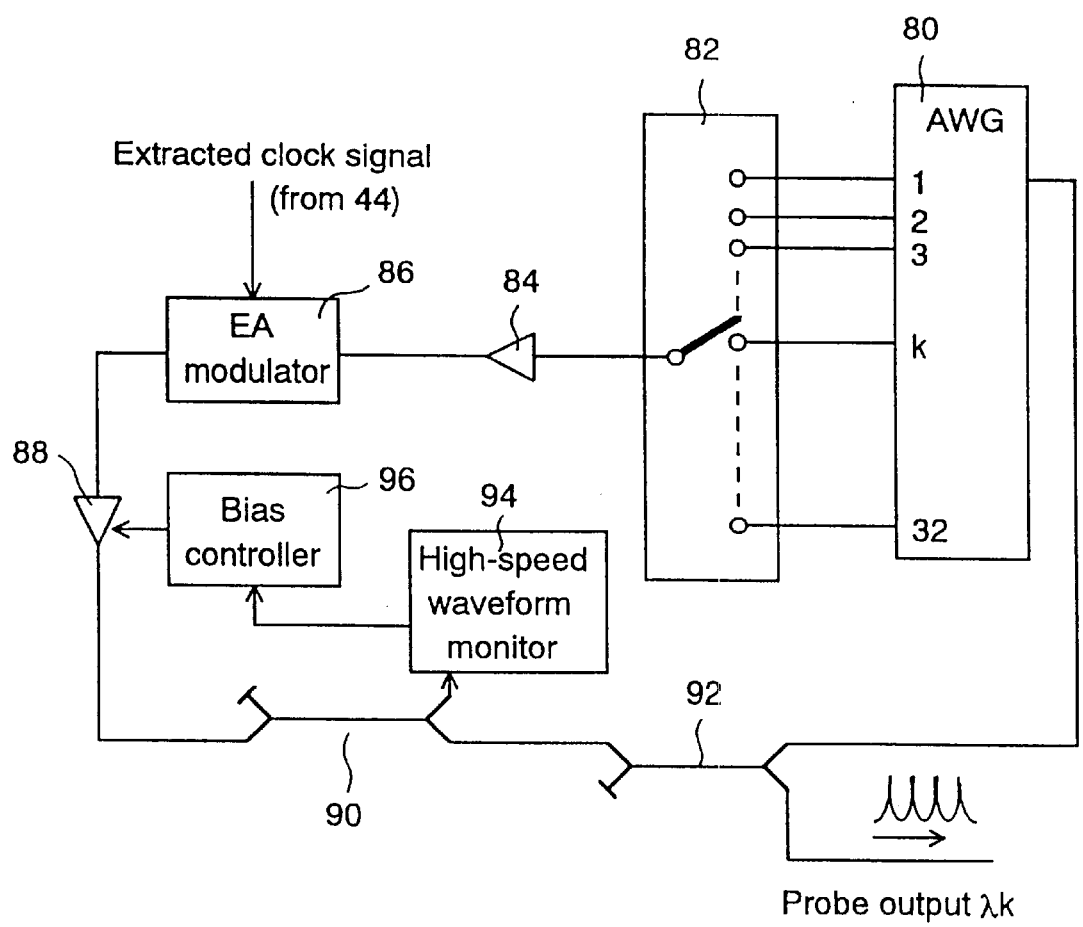
FIG. 3 is a schematic block diagram of a wavelength tunable probe light source suitable for a wavelength division multiplexing transmission system.
Figure 4:
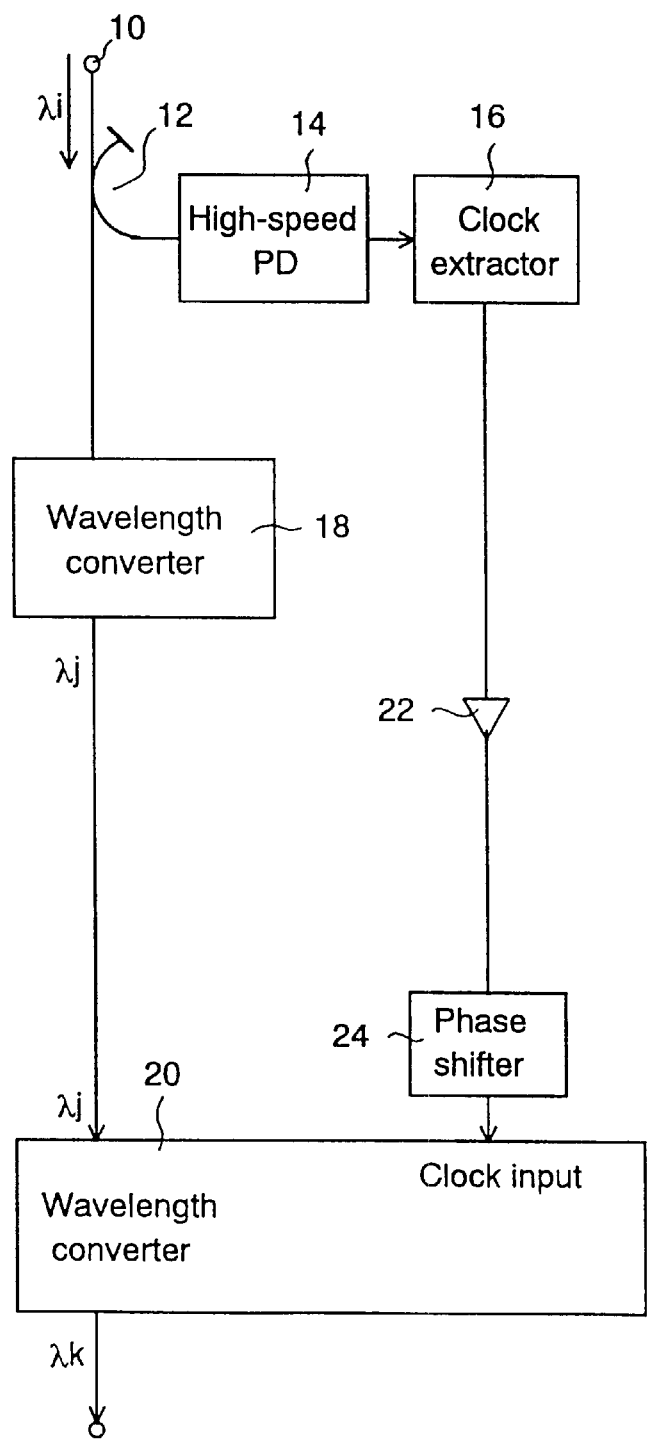
FIG. 4 is a schematic block diagram of a conventional all-optical signal generator.

In the embodiment shown in FIG. 1, the output wavelength λk should be equivalent to a wavelength used in an optical network as close as possible. As an element for wavelength-demultiplexing the number of wavelength division multiplexed wavelengths, for example 32 wavelengths, an arrayed waveguide grating has been considered as a promising one. FIG. 3 shows a schematic block diagram of wavelength tunable laser having wavelength selective characteristics by using the arrayed waveguide grating. In FIG. 3, a wavelength tunable probe light source comprises a fiber ring laser in which an arrayed waveguide grating 80 for demultiplexing wavelengths, an optical switch 82 for selecting an oscillating wavelength, an optical amplifier 84, an EA modulator 86 for pulsating a laser light with an extracted clock (the output of a phase shifter 44), a semiconductor laser amplifier 88 for coinciding a longitudinal mode-locked frequency with an extracted clock frequency and optical couplers 90 and 92 are connected as forming a ring.

The arrayed waveguide grating 80 demultiplexes light from one output of the optical coupler into 32 wavelengths of λ1~λ2 and the optical switch 82 selects one wavelength (namely, an oscillating wavelength) from the outputs of respective wavelengths of the arrayed waveguide grating 80. The light having the wavelength selected by the optical switch 82 is amplified by the optical amplifier 84 and enters the EA modulator 86. Since a clock signal from the phase shifter 44 is applied to an electrode of the EA modulator 86, the incident light is intensity-modulated by the clock and becomes a mode-locked short pulse light (RZ pulse light).

The output light of the EA modulator 86 entered the semiconductor laser amplifier 88 is amplified and phase-adjusted. The output light of the semiconductor laser amplifier 88 is divided into two portions by the optical coupler 90; one portion enters the optical coupler 92 and the other portion enters the high-speed waveform monitor 94. The high-speed waveform monitor 94 converts the incident light to an electrical signal and monitors its optical pulse waveform. To obtain a desired optical pulse waveform, the high-speed waveform monitor 94 controls the bias to be applied to the semiconductor laser amplifier 88 using the bias controlling circuit 96. As a result, the mode-locked frequency matches up with the extracted clock frequency.

The light entered the optical coupler 92 is divided in two; one enters the arrayed waveguide grating 80 and the other outputs to the outside as a probe pulse light. By this operation, individual wavelengths can be selected that coincide with a plurality of wavelengths specified on optical networks.

Figure 6:
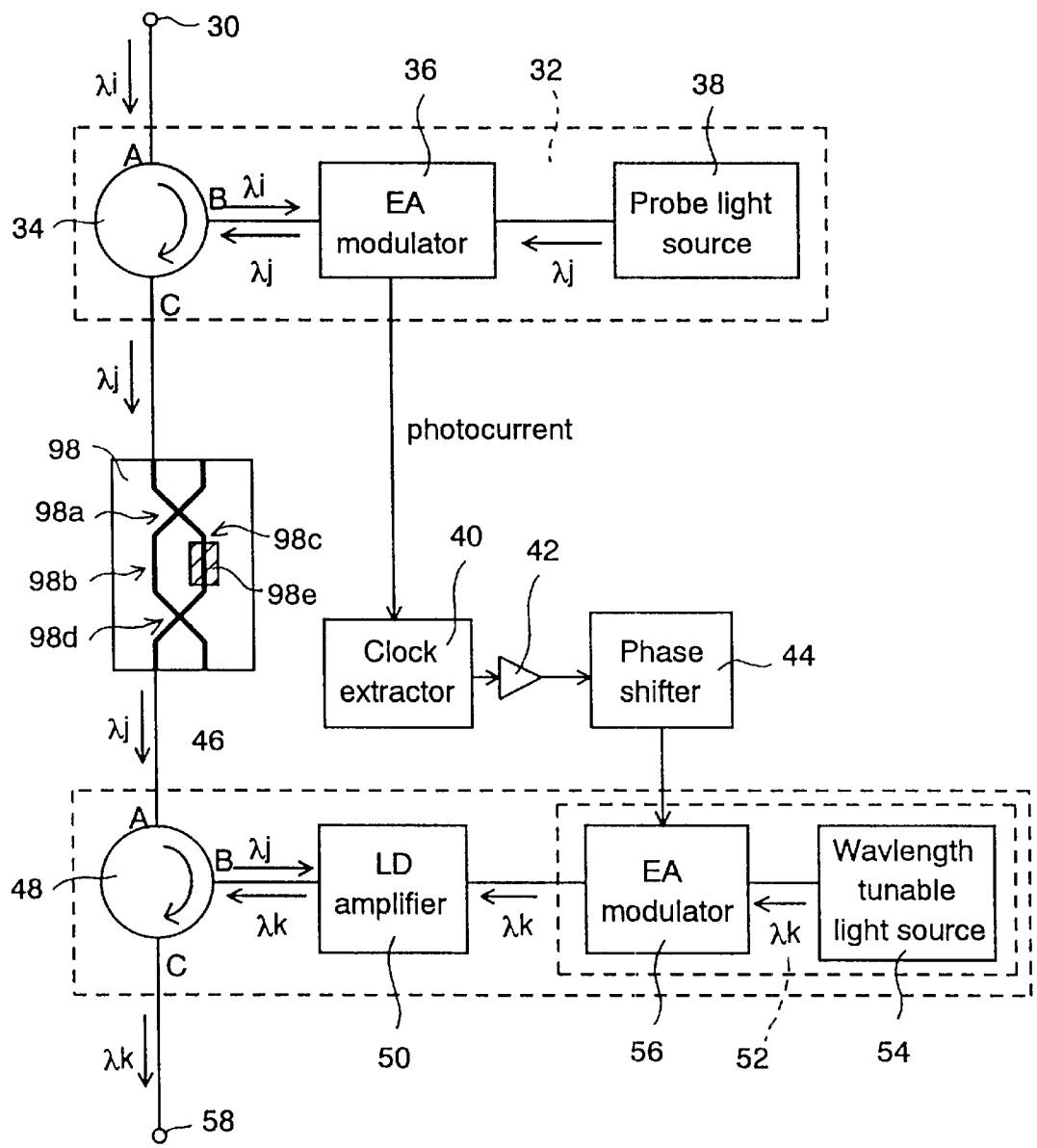
FIG. 6 is a schematic block diagram of a second embodiment of this invention.

By providing an optical pulse stretcher between the wavelength converters 32 and 46 for stretching an optical pulse width, the margin to the jitter can be improved. FIG. 6 shows a schematic block diagram of the modified embodiment. Identical elements are labeled with reference numerals common to those in FIG. 1. Numeral 98 shows an optical pulse stretcher for widening a pulse width of the optical pulse output from (the port C of the optical circulator 34 of) the wavelength converter 32.

Figure 5:
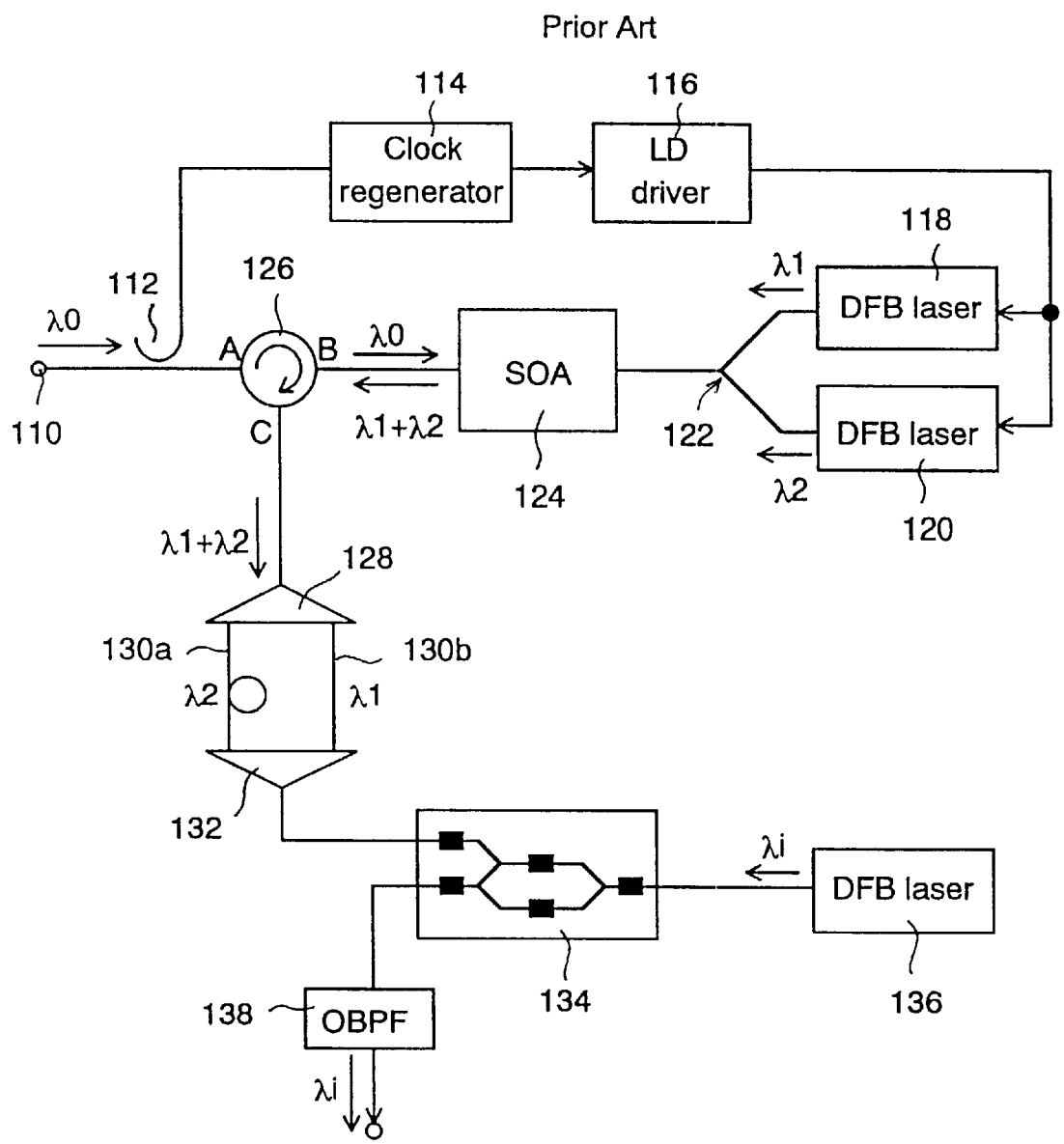
FIG. 5 is a schematic block diagram of a conventional all-optical signal generator.

In the structure such as the conventional structure shown in FIG. 5 that employs two probe lights having mutually different wavelengths and combines them after their propagation on different optical path lengths, it is necessary to highly stabilize the two wavelengths because not only the two probe light sources are needed but also the two wavelengths must be demultiplexed with extraordinary precision. Therefore, it is difficult to maintain the high reliability over a long term and also the costs increase.

However, in an embodiment shown in FIG. 6, the optical pulse stretcher 98 comprises a Mach-Zehnder interferometer of a silica glass waveguide and, thus, the stable transmission characteristics over a ling term can be maintained as well as the reliability of the whole apparatus improves. In the optical pulse stretcher 98, the optical pulse (wavelength λj) input to the optical pulse stretcher 98 from the wavelength converter 32 is divided into two by a divider 98a and propagated on two optical paths 98b and 98c having different optical path lengths. The lights propagated on the two optical paths 98b and 98c are combined by a combiner 98d and enter the port A of the optical circulator 48 of the second wavelength converter 46. The difference of the optical path lengths of the two optical paths 98b and 98c are adjusted so that the pulse width is widened approximately twice due to the combining by the combiner 98d. When the combining is performed by the combiner 98d, interference occurs at the point where the optical pulses propagated on the two optical paths 98b and 98c are superimposed each other in a time domain and it causes fluctuation of the optical pulse waveform after the combining. To solve the problem, a heater 98e should be disposed on one optical path 98c. By adjusting the temperature of the heater 98e, the difference of the optical phases between the optical paths 98b and 98c is controlled so that the waveform after the combining becomes the optimum shape (a waveform having a flat peak).

As the alternative to the heater 98e, the divider 98a and the combiner 98d are replaced with polarization beam splitters in which a TE wave (or a TM wave) and a TM wave (or a TE wave) respectively propagate on the optical paths 98b and 98c. In this case, the polarization should be preserved on the line path between the probe light source 38 and the optical pulse stretcher 98.

The pulse width of the optical pulse is widened by the optical pulse stretcher 98 and then a probe pulse light is sampled by the optical pulse of the stretched pulse width at the wavelength converter 46. As a result, an optical pulse output can be obtained excellent both in timing and waveform. Since the optical pulse stretcher 98 comprises a passive element that can maintain the stable transmission characteristics over a long time, this embodiment is capable of preserving the stable optical regenerating function for a long period of time. Needless to say, trouble seldom occurs.

Figure 7:
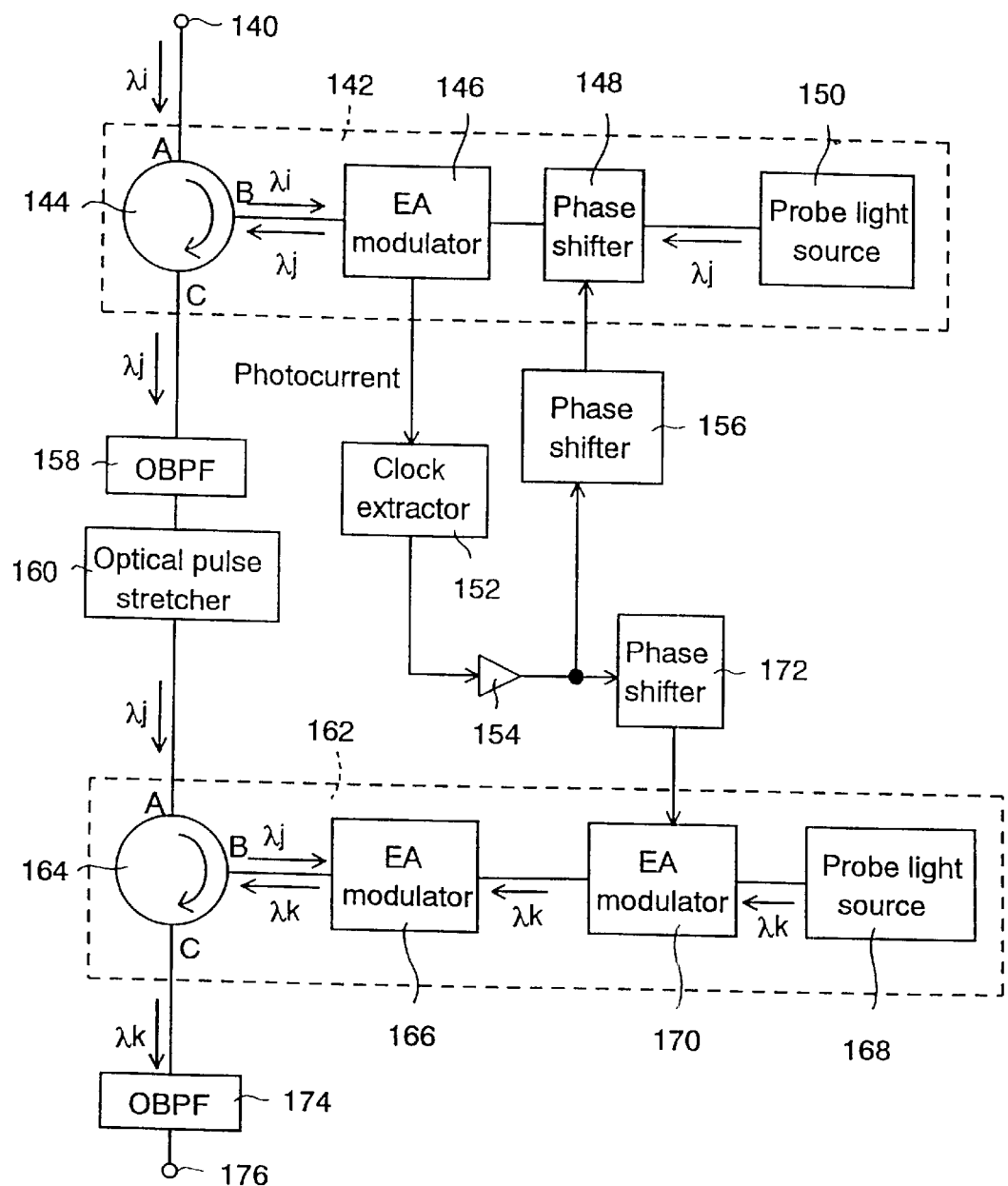
FIG. 7 is a schematic block diagram of a third embodiment of this invention.

The optical pulse stretcher 98 can comprise a high dispersion medium for example such as a high dispersion fiber used for compensating accumulative wavelength dispersion. However, when an existing high dispersion fiber is used, a long fiber between several km and several tens km is required. If a high dispersion fiber of a higher wavelength dispersion value is obtained, it is obvious that the fiber length can become shorter accordingly. To cope with the problem, using phase modulation together can shorten the length of the high dispersion medium. FIG. 7 shows a schematic block diagram of the embodiment. In the embodiment shown in FIG. 7, a phase modulator is disposed in the first wavelength converter, which phase modulator phase-modulates a probe light in synchronization with an input light pulse. It uses that a pulse width of an optical pulse widens in a time domain in a high dispersion medium due to the chirping by the phase modulation.

The structure and operation of the embodiment shown in FIG. 7 will be explained. An RZ optical pulse signal of wavelength λi from a trunk line system inputs an input terminal 140. The RZ optical pulse input the optical input terminal 140 enters the port A of an optical circulator 144 of a wavelength converter 142. The optical circulator 144 is an optical element for outputting the input light of the port A from the port B and outputting the input light of the port B from the port C. The port B of the optical circulator 144 optically couples with one facet of an EA modulator 146 and a CW probe light of wavelength λj (≠λi) output from a probe light source inputs the other facet of the EA modulator 146 through a phase modulator 148. Similarly to the EA modulator 36, the EA modulator 146 is applied by a constant DC voltage.

Figure 8A:
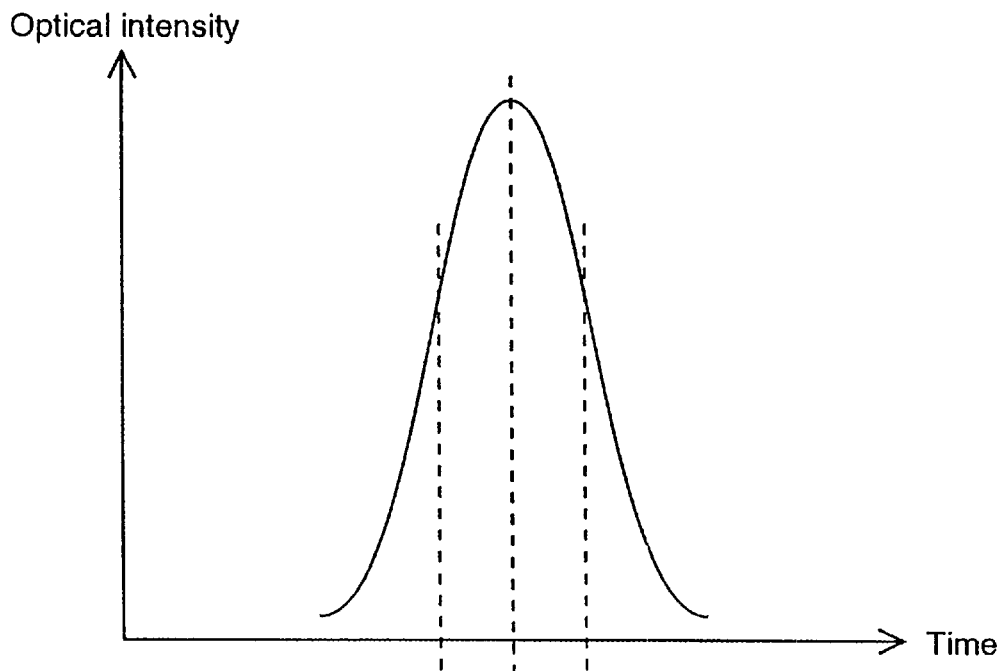
FIG. 8(A) is a diagram showing timing of an RZ pulse of wavelength $\lambda i$ being input an EA modulator 146.
Figure 8B:
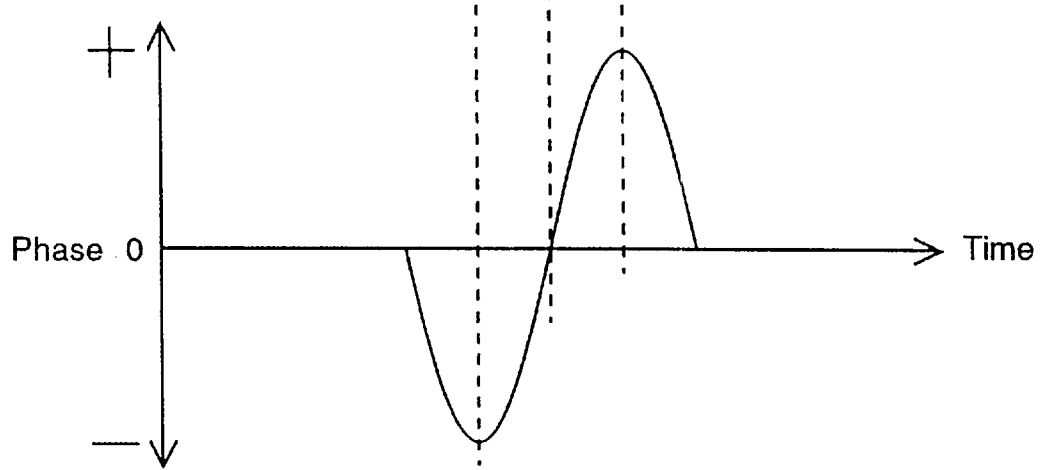
FIG. 8(B) is a diagram showing a phase change at a phase modulator 148.

In the same way as the EA modulator 36, a photocurrent in accordance with the intensity change of the input light is generated in a electrode of the EA modulator 146. The generated photocurrent is applied to a clock extractor 152. The clock extractor 152 extracts and regenerates a clock component from the input photocurrent. The clock extracted by the clock extractor 152 is amplified by an amplifier 154, phase-shifted (phase-adjusted) by a phase shifter 156, and applied to a phase modulator 148. From this operation, the phase modulator 148 modulates the phase of the probe light output from the probe light source in synchronization with the RZ optical pulse of wavelength λi input the EA modulator 146 from the port B of the optical circulator 144. FIGS. 8(A) and 8(B) are diagrams showing the relation between the phase modulation at the phase modulator 148 and the RZ optical pulse of wavelength λi input the EA modulator 146 from the port B of the optical circulator 144. FIG. 8(A) shows timing of the RZ optical pulse and FIG. 8(B) shows the phase change at the phase modulator 148. In FIG. 8(A), the vertical axis and the horizontal axis respectively show optical intensity and time. In FIG. 8(B), the vertical axis and the horizontal axis respectively show phase and time.

In the EA modulator 146, The RZ optical pulse of wavelength λi and the cw probe light of wavelength λj propagate in mutually opposite directions. By this operation, the optical intensity of the probe light of wavelength λj reflects the optical intensity change of the RZ optical pulse of wavelength λi and consequently a wavelength of an optical carrier conveying the signal is converted from the wavelength λi to the wavelength λj.

The probe light of wavelength λj output from the EA modulator 146 inputs the port B of the optical circulator 144 and outputs from its port C toward the outside of the wavelength 142. The output light from the port C of the optical circulator 144 enters a second wavelength converter 162 via an optical band pass filter 158 for transmitting only the wavelength λj and an optical pulse stretcher 160 for stretching the optical pulse width in a time domain. The optical band pass filter 158 is disposed for preventing the component of wavelength λi to be provided to the rear stage. The optical pulse stretcher 160 for example comprises a high dispersion medium having a large wavelength dispersion at the wavelength λj such as a high dispersion fiber. This operation uses the characteristics that the pulse width of the optical pulse stretches before and after of time when an optical pulse whose phase fluctuates in the relation shown in FIG. 8 transmits in a medium of large wavelength dispersion. The phase modulation at the phase modulator 148, concretely the quantity of the phase adjusting by the phase shifter 156 is determined so as to cause the above pulse width stretch. For example, in case of 10 Gbit/s transmission rate, the optical pulse stretcher 160 stretches the pulse width of the optical pulse of wavelength λj output from the optical filter 158 from 20~30 ps to 40~60 ps, namely approximately twice in width.

The output light of the optical pulse stretcher 160 enters the port A of the optical circulator 164 of the second wavelength converter 162 and outputs from the port B. The output light of the port B of the optical circulator 164 enters one facet of the EA modulator 166. The wavelength converter 162 comprises a second probe light source 168 for generating a CW probe light of wavelength λk different from the wavelength λj. λk also can be equal to λi. The probe light having output from the probe light source 168 enters an EA modulator 170. A phase shifter 172 adjusts the phase of output of the amplifier 154, namely the phase of the clock extracted and regenerated by the clock extractor 152, and applies it to the electrode of the EA modulator 170. The EA modulator 170 modulates the intensity of the output light from the probe light source 168 in accordance with the output of the phase shifter 172. The output of the EA modulator 170 has an RZ optical pulse train of the same frequency with that of the clock extracted and regenerated by the clock extracting circuit 152 and inputs the other facet of the EA modulator 166.

In the EA modulator 166, the output light (wavelength λj) from the port B of the optical circulator 164 and the RZ pulsed probe light (wavelength λk) from the EA modulator 170 transmit in mutually opposite directions. Similarly to the EA modulator 146, the RZ probe light is gated or sampled by the intensity of the output light (wavelength λk) from the port B of the optical circulator 164. As a result, the optical carrier for conveying the signal is converted from the light of wavelength λj to the light of wavelength λk. The alternative to the EA modulator 166, a semiconductor laser amplifier can be employed. In terms of the gain, the semiconductor laser amplifier is more preferable. However, considering that non-inversion output waveform can be obtained and in respect of the signal to noise ratio, the EA modulator is more preferable.

The probe light of wavelength λk transmitted through the EA modulator 166 is what the pulse signal light being input the optical input terminal 140 is the so-called 3R (Retiming, Reshaping and Regeneration) regenerated. The probe light of wavelength λk transmitted the EA modulator 166 inputs the port B of the optical circulator 164 and outputs from its port C. An optical band pass filter 174 for transmitting through only the wavelength λk is connected to the port C of the optical circulator 164 and thus the component of the wavelength λk alone is extracted from the output light of the port C of the optical circulator 164. The output light of the optical band pass filter 174 outputs from an optical output terminal 176 to the outside. The optical band pass filter 174 prevents that for example the light of wavelength λj reflected by the facet of the EA modulator 166 is output toward the outside.

In the embodiment shown in FIG. 7, since the phase modulation by the phase modulator 148 is used together with the optical pulse stretcher 160 using the high dispersion medium, the length of the high dispersion medium used in the optical pulse stretcher 160 can be greatly shortened and, therefore, the optical pulse stretcher itself, ultimately the whole embodiment shown in the FIG. 7 can become smaller. In the conventional structure shown in FIG. 5, the two probe light sources 118 and 120, the wavelength demultiplexing element 128 such as an AWG, the two optical paths 130*a* and 130*b* having the predetermined difference between the optical paths, and the multiplexer 132 are indispensable for stretching the optical pulse width in a time domain. However, in this embodiment, the single probe light source 150 is sufficient and the multiplexing/demultiplexing becomes unnecessary. Therefore, the costs can be reduced and the reliability can be improved. Furthermore, since the elements requiring adjustment are reduced, the production and the maintenance become easier.

Figure 9:
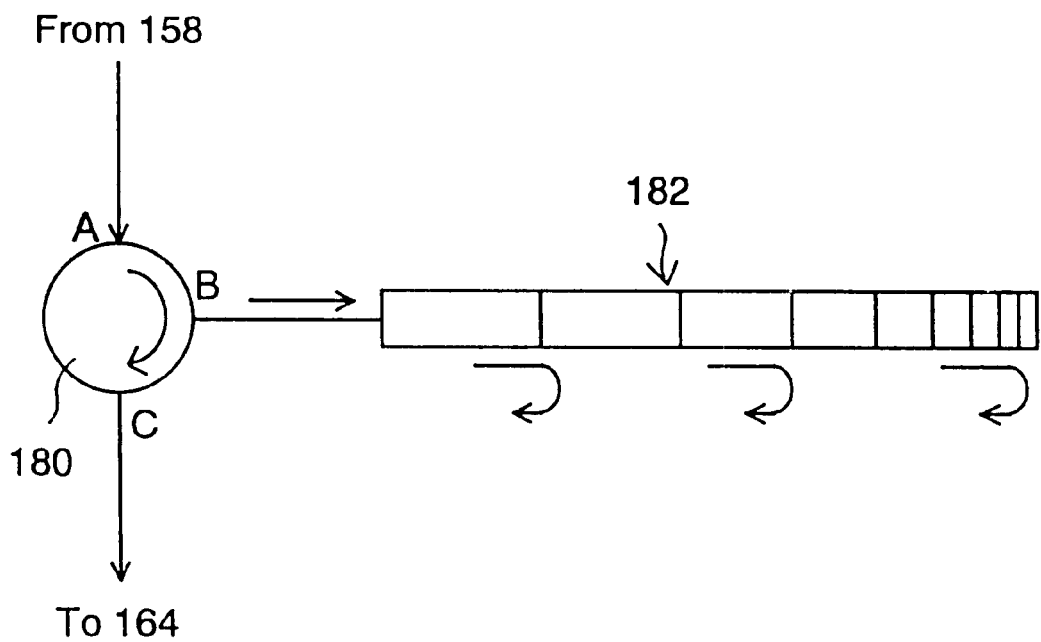
FIG. 9 is a schematic block diagram showing another configuration of an optical pulse stretcher.

As mentioned above, the optical pule stretcher 160 can comprise a high dispersion optical fiber used for compensating accumulative wavelength dispersion, which is formed only with the so-called dispersion equalizing fiber. However, as shown in FIG. 9, it is also possible to use an apparatus in which a chirped fiber grating and an optical circulator are combined. The chirped fiber grating can be regarded the same with the high dispersion fiber in terms of its function. In the structure shown in FIG. 9, the output light of the optical band pass filter 158 enters a port A of an optical circulator 180. A chirped fiber grating 182 connects to a port B of the optical circulator. The chirped fiber grating 182 is a grating element in which a reflection wavelength is shifted in its longitudinal direction. In this embodiment, the long wavelength reflection side of the grating connects to the port B of the optical circulator 180. The reflection wavelength at the middle point of the chirped fiber grating 182 is predetermined as the wavelength λj. The port C of the optical circulator 180 connects to the port A of the optical circulator 164.

In the structure shown in FIG. 9, the output light from the optical band pass filter 158 inputs the port A of the optical circulator 180, outputs from the port B, and then enters the chirped fiber grating 182. The chirped fiber grating 182 practically functions similarly to the high dispersion fiber and the pulse width of the reflected pulse light of the chirped fiber grating 182 stretches wider than that of the input pulse light in a time domain. The pulse light reflected at the chirped fiber grating enters the port B of the optical circulator 180, outputs from its port C, and then enters the port A of the optical circulator 164.

When the length of the chirped fiber grating 182 is about 1 cm, the optical pulse having several femto-seconds in pulse width is stretched only several ps. However, if the chirped fiber grating 182 of several meters long is realized, the pulse width stretching of the same degree with the high dispersion fiber described above can be obtained.

The chirped fiber grating 182 can be replaced with a high dispersion fiber with its termination being totally reflective. In this case, it is obvious that the length of the high dispersion fiber can be reduced to half compared to the case that the high dispersion fiber in a transmissible state is used.

When the high dispersion medium is used as a means for stretching the optical pulse width, the pulse width stretching effect by the wavelength dispersion can be increased by using a Fabry-Perot laser or a multi wavelength laser as the light source instead of using a single longitudinal mode oscillation laser.

Figure 10:
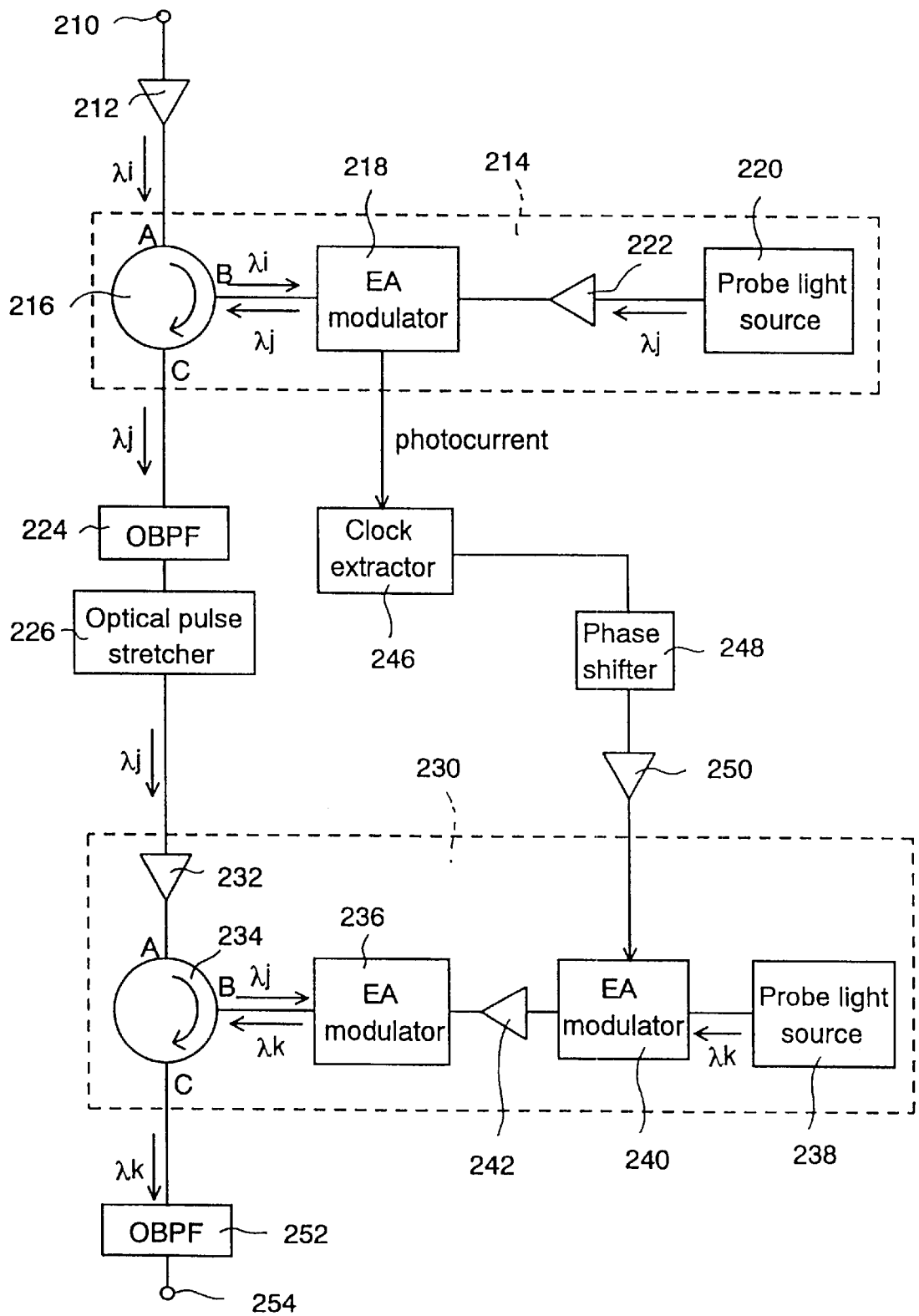
FIG. 10 is a schematic block diagram of a fourth embodiment of this invention.

FIG. 10 shows a schematic block diagram of the embodiment. An RZ optical pulse signal of wavelength λi from the trunk line system enters an input terminal 210. The RZ optical pulse input the optical input terminal 210 is optically amplified by an erbium doped optical amplifying fiber (EDFA) 212 and enters a first wavelength converter 214. In the first wavelength converter 214, the output light from the optical amplifying fiber 212 inputs the port A of an optical circulator 216, outputs from its port B, and then enters one facet of an EA modulator 218. A probe light source 220 comprises an incoherent light source or a multi wavelength light source and generates a probe light of the wavelength λj different from the wavelength $\lambda i$ of the input signal light. The output light of the probe light source 220 is optically amplified by an EDFA 222 and enters the other facet of the EA modulator 218. Similarly to the EA modulators 36 and 144, the EA modulator 218 is applied by a constant DC voltage.

In the EA modulator 218, the RZ optical pulse of the wavelength $\lambda i$ and the CW probe light of the wavelength $\lambda j$ propagate in mutually opposite direction. Consequently, the optical intensity of the probe light of the wavelength $\lambda j$ reflects the optical intensity change of the RZ optical pulse of the wavelength $\lambda i$ and, therefore, the wavelength of the optical carrier conveying the signal is converted from the wavelength $\lambda i$ to the wavelength $\lambda j$.

The probe light of the wavelength $\lambda j$ out put from the EA modulator 218 enters the port B of the optical circulator 216 and outputs from its port C toward the outside of the wavelength converter 214. The output light of the port C of the optical circulator 216 enters a second wavelength converter 230 through an optical band pass filter 224 for passing through only the wavelength $\lambda j$ and an optical pulse stretcher 226 for stretching the optical pulse width in a time domain.

The optical band pass filter 224 is disposed for preventing that the component of the wavelength $\lambda i$ is supplied to the rear stage. The optical pulse stretcher 226 has a structure using an optical pulse stretcher 98 comprising Mach-Zehnder interferometer shown in FIG. 6, a high dispersion medium having a large wavelength dispersion at the wavelength $\lambda j$ such as a high dispersion fiber or a chirped grating fiber shown in FIG. 9. In an embodiment shown in FIG. 10, since the probe light source 220 generates a wide spectrum light such as an incoherent light source or a multi wavelength light source, for example even if a high dispersion fiber is used, its length becomes shorter and, thus, also it becomes unnecessary that the probe light is phase-modulated in advance at the wavelength converter 226 in the first stage. When the Mach-Zehnder interferometer shown in FIG. 6 is employed as the optical pulse stretcher 226, the influence of the interference is reduced or defused by using an incoherent light source as the probe light source 220.

The output light of the optical pulse stretcher 226 inputs the second wavelength converter 230, is amplified by an EDFA 232, enters the port A of an optical circulator 234 and outputs from the port B. The output light from the port B of the optical circulator 234 enters one facet of an EA modulator 236. The wavelength converter 230 comprises a second probe light source 238 for generating a CW probe light of the wavelength $\lambda k$ different from the wavelength $\lambda j$. $\lambda k$ also can be equal to $\lambda i$. The probe light output from the probe light source 238 enters an EA modulator 240. The EA modulator 240, as to be described later, intensity-modulates and RZ-pulsates the probe light output from the probe light source 238 in accordance with the clock generated from the optical pulse that inputs the input terminal 210. The probe light being RZ pulsed by the EA modulator 240 is optically amplified by an EDFA 242 and enters the other facet of the EA modulator 236.

Similarly to the EA modulators 36 and 144, at the electrode of the EA modulator 218, a photocurrent also generates in accordance with the intensity change (concretely the intensity change of the signal light that inputs the input terminal 210) of the input light. The generated photocurrent is applied to a clock extracting circuit 246 and the clock extracting circuit 246 extracts and regenerates the clock component from the input photocurrent. The clock extracted by the clock extracting circuit 246 is phase-shifted by a phase shifter 248, amplified by an amplifier 250, and applied to an EA modulator 241 as its driving signal. As mentioned above, the EA modulator 240 converts the output light of the probe light source 238 to an RZ optical pulse according to the output voltage from the amplifier 250. The output of the EA modulator 240 shows an RZ optical pulse train of the same frequency with that of the clock extracted and regenerated by the clock extracting circuit 146.

In the EA modulator 236, the output light (wavelength $\lambda j$) from the port B of the optical circulator 234 and the RZ pulsed probe light (wavelength $\lambda k$) from the EDFA 242 propagate in mutually opposite directions. By the similar function performed in the EA modulator 218, the RZ pulsed probe light is sampled or gated in accordance with the intensity of the output light (wavelength $\lambda j$) from the port B of the optical circulator 234. Consequently, the optical carrier conveying the signal is changed from the light of the wavelength $\lambda j$ to the light of the wavelength $\lambda k$.

The probe light of the wavelength $\lambda k$ transmitted through the EA modulator 236 is the light formed by 3D-regenerating the pulsed signal light that inputs the optical input terminal 210. The probe light of the wavelength $\lambda k$ transmitted through the EA modulator 236 input the port B of the optical circulator 234 and outputs from its port C. The port C of the optical circulator 234 connects to an optical band pass filter for passing only the wavelength $\lambda k$ through. The optical band pass filter 252 allows to pass through only the wavelength $\lambda k$ component from the output light of the port C of the optical circulator 234. The output light of the optical band pass filter 252 is output from an optical output terminal 254 toward the outside. Since the optical band pass filter 252 is disposed, it is prevented that the unnecessary light, such as the light of the wavelength $\lambda j$ reflected by the facet of the EA modulator 236, is output the outside.

Figure 11:
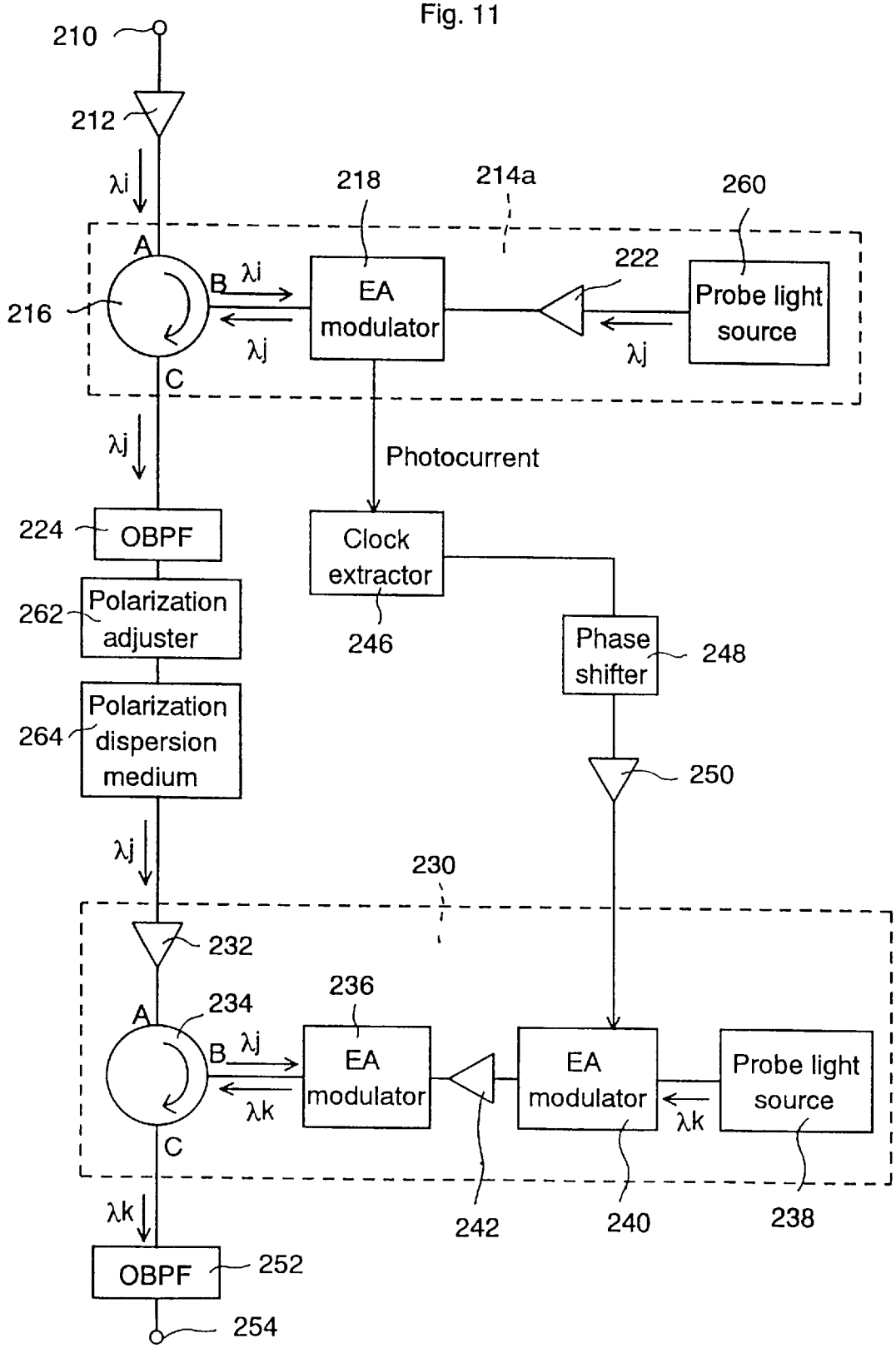
FIG. 11 is a schematic block diagram of a fifth embodiment of this invention.

FIG. 11 shows a schematic block diagram of the embodiment in which an optical pulse width is stretched utilizing the propagation time difference of polarization. Identical elements are labeled with reference numerals common to those in FIG. 10. In this embodiment, similarly to the embodiment shown in FIG. 1, a laser light source of a single wavelength with a narrow spectrum is employed as a probe light source in a first wavelength converter without using a incoherent light source or a multi wavelength light source. In this embodiment, the optical pulse width is stretched using the difference of the propagation delay times between TE and TM waves of the probe light.

A wavelength converter 214a comprises a probe light source 260 that laser-oscillates at a single wavelength $\lambda j$ of a narrow spectrum in place of the probe light source 220 in the wavelength converter 214. The wavelength converter 214a converts the signal light of the wavelength $\lambda i$ input from the input terminal 210 into the wavelength $\lambda j$ and outputs it from the port C of the optical circulator 216 toward the outside. Similarly to the embodiment shown in FIG. 10, the output light from the port C of the optical circulator 216 enters the optical band pass filter 224 for passing only the wavelength $\lambda j$ through and is extracted the wavelength $\lambda j$ component alone there.

A polarization adjuster 262 adjusts the polarization of the output light from the optical band pass filter 224 so as to be at an angle of 45° to the principal axis (the fast axis or the slow axis) of a polarization dispersion medium 264 and input sit the polarization dispersion medium 264. It is obvious that if such adjustment of polarization is unnecessary, the polarization adjuster 262 can be omitted. The polarization dispersion medium 264 comprises a polarization preserving fiber or a silica optical waveguide (PLC) having large polarization dispersion as same as the input optical pulse width. Needless to say, in this embodiment, the light path between the probe light source 260 and the polarization dispersion medium 264 comprises a transmission medium for preserving a plane of polarization.

Figure 12:
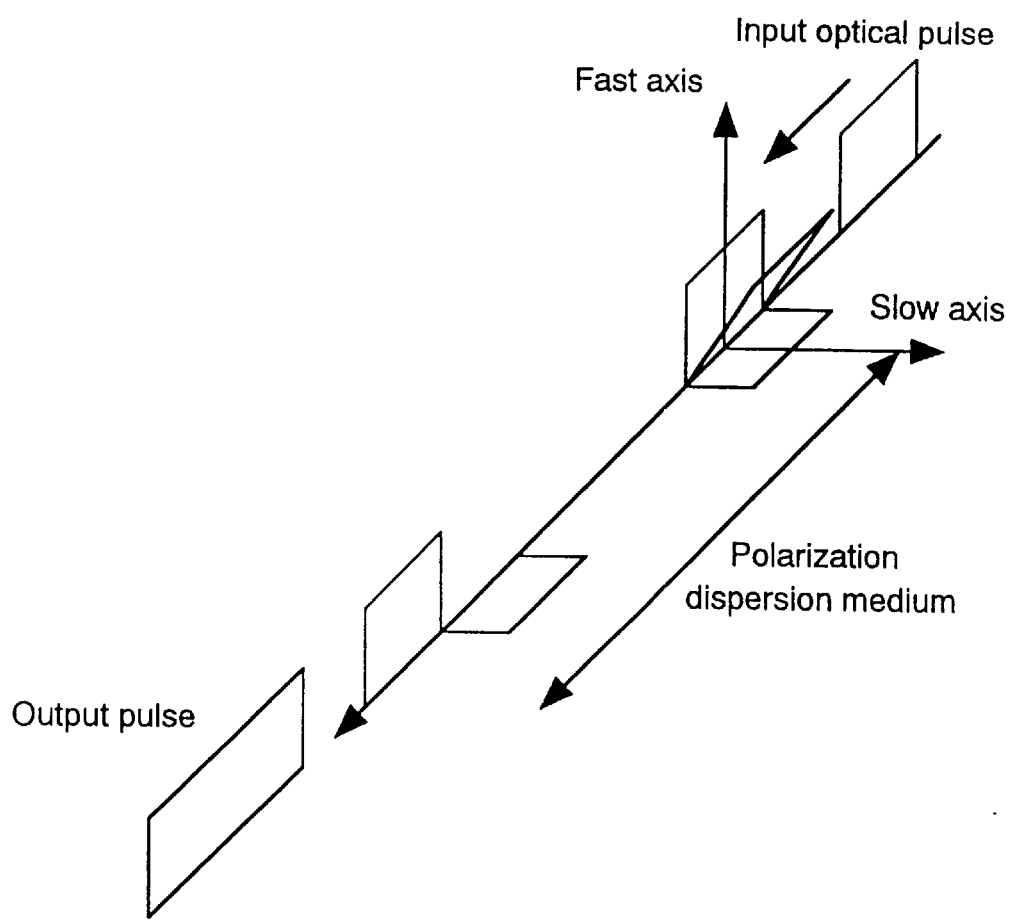
FIG. 12 is a diagram showing a propagation state of optical pulses in fast and slow axes of a polarization dispersion medium 264, and also showing an optical pulse waveform after the combination.

The length of the polarization dispersion medium 264 is adjusted so that the optical pulse of the slow axis is delayed about 1 pulse width compared with the optical pulse of the fast axis in the process of the propagation and the optical pulses of the orthogonal polarization directions are combined having a gap of the extent of the optical pulse width in a time domain at the output stage of the polarization dispersion medium 264. That is, the polarization dispersion medium 264 stretches the optical pulse width using the difference of the propagation time of both polarization directions. FIG. 12 is a diagram showing the propagation condition of an optical pulse in the fast axis and an optical pulse in the slow axis and an optical pulse waveform after the combining.

The signal light that inputs the input terminal 210 contains the possibility whose polarization fluctuates at random since it propagates a long transmission line. Therefore, in the embodiment shown in FIG. 11, the length of the polarization preserving fiber between the port B of the optical circulator 216 and the EA modulator 218 needs to be short enough so that the input signal light is not affected by the polarization dispersion while it is propagating the fiber.

The pulse light (wavelength $\lambda_j$), its optical pulse width being stretched by the polarization dispersion medium 264, enters the wavelength converter 230. The operation of the wavelength converter 230 is not described here since it is the same with the embodiment shown in FIG. 10.

Figure 13:
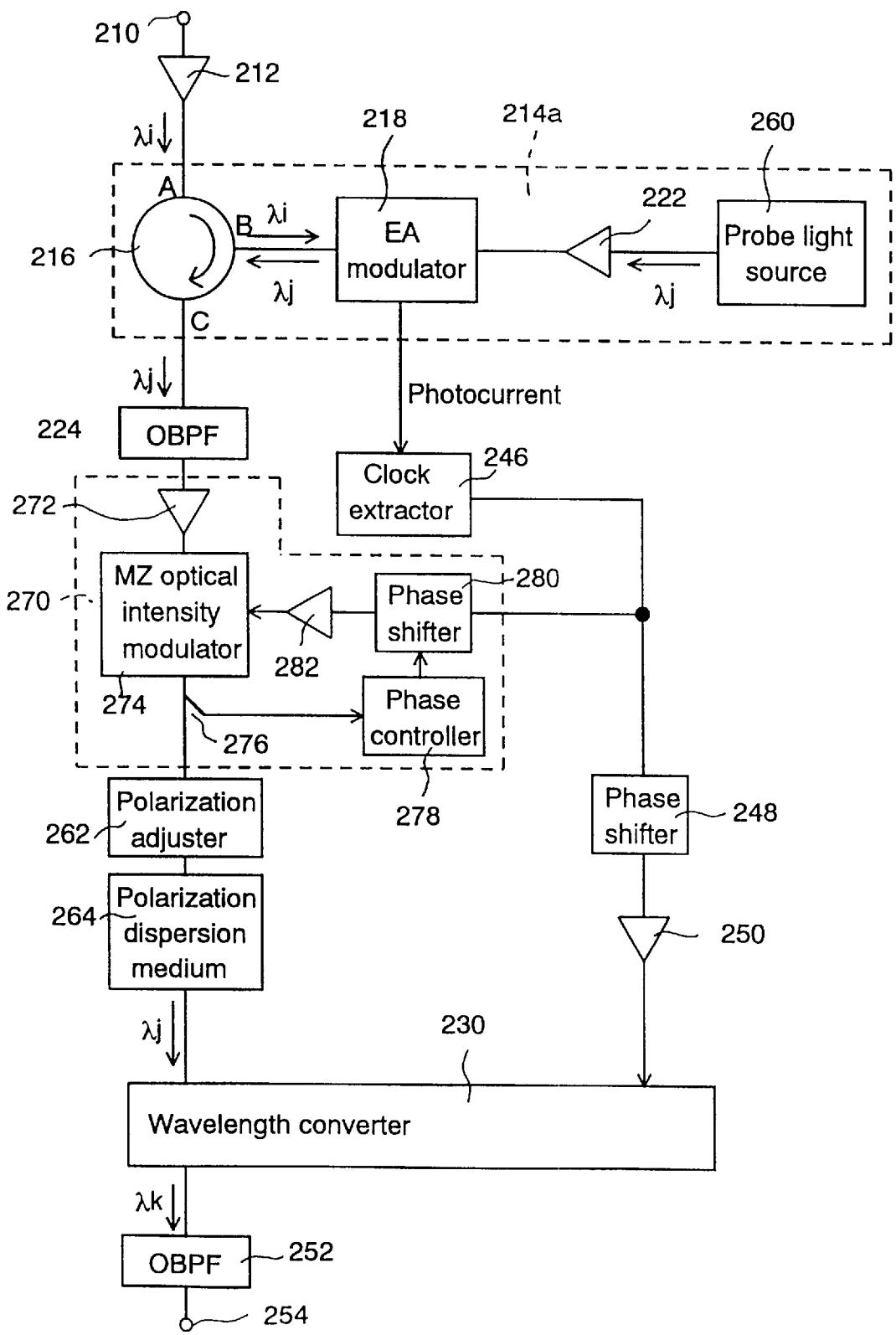
FIG. 13 is a schematic block diagram of a sixth embodiment of this invention.

An embodiment of a larger extinction ratio and an improved S/N ratio compared to the embodiment shown in FIG. 11 will be explained. FIG. 13 shows a schematic block diagram of the modified embodiment. Identical elements are labeled with reference numerals common to those in FIG. 11.

In the embodiment shown in FIG. 13, an optical gate 270 is disposed between the optical band pass filter 224 and the polarization adjuster 262. The optical gate 270 gates the signal pulse portion from the output light of the optical band pass filter 224 in accordance with the clock extracted by the clock extracting circuit 246. In this embodiment, to increase the capacity for following the fluctuation of the jitter, the timing of gating is automatically adjusted according to the gating result.

The modified part of the embodiment shown in FIG. 13 will be explained in detail. In the optical gate 270, an EDFA 272 amplifies the output light of the optical band pass filter 224 and an MZ optical intensity modulator 274 gates the marked portion of the signal light from the output light of the EDFA 272. The operation of the MZ optical intensity modulator 274 will be described later. A divider 276 supplies the most of the output light from the MZ optical intensity modulator 274 to the polarization adjuster 262 and supplies the rest to a phase controller 278. The phase controller 278 comprises a photodiode for converting an incident light into an electric signal and a circuit for generating a phase controlling signal that controls the phase of the clock in accordance with the output of the photodiode. Since the photodiode can be low-speed as long as it can follow the clock frequency of the signal, it can be obtained low-priced.

A phase shifter 280 shifts the phase of the clock extracted by the clock extracting circuit 246 by a quantity specified by the phase error signal from the phase controller 278. The clock phase-shifted by the phase shifter 280 is amplified by an amplifier 282 and applied to the MZ intensity modulator 274 as a modulation signal or an optical gate controlling signal.

The MZ optical intensity modulator 274 is feedback-controlled by the divider 276, the phase controller 278, the phase shifter 280 and the amplifier 282 so that the average power of the output light from the MZ optical intensity modulator 274 becomes the maximum.

Figure 14:
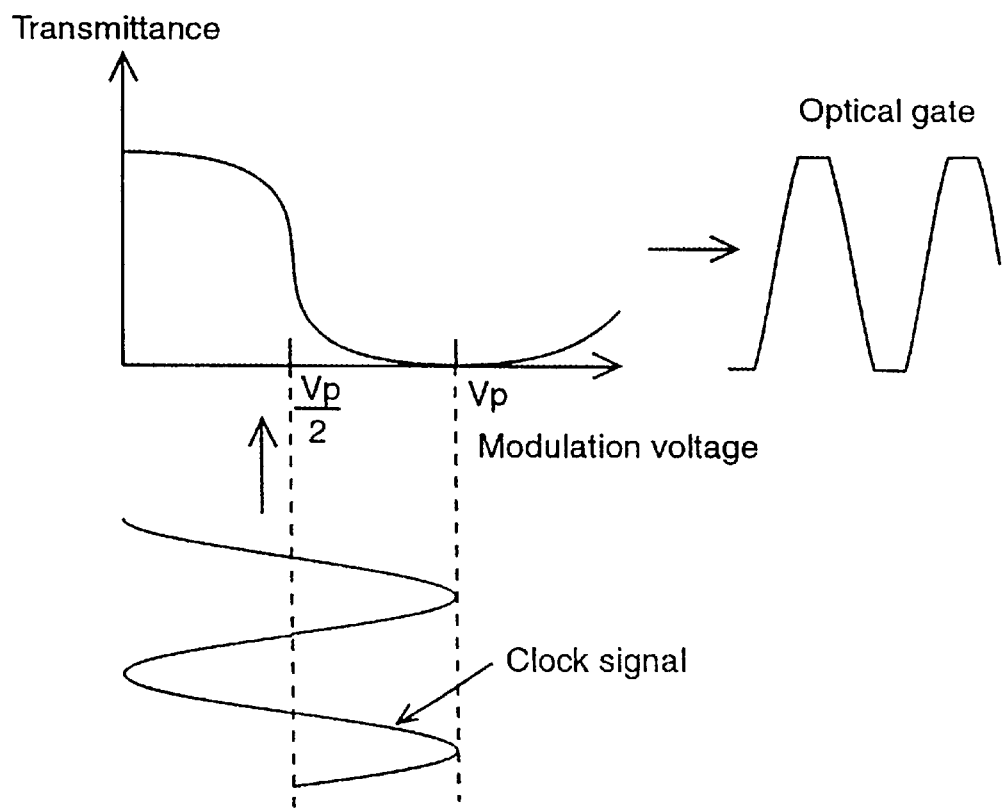
FIG. 14 is a diagram showing the transmission characteristics of an MZ optical intensity modulator 274 against a modulation signal voltage.

The clock waveform output from the clock extractor 246 is generally a sine wave. The transmission characteristics of the MZ optical intensity modulator 274 against the modulation signal voltage usually shows a sine wave state as shown in FIG. 14. Accordingly, when the voltage amplitude of the sine wave modulation signal (the output of the amplifier 282) and the bias voltage are respectively adjusted to around Vp and Vp/2, the MZ optical intensity modulator 274 can perform the rectangular optical gate operation. FIGS. 15(A)~15(C) show diagrams of the optical gate operation. FIGS. 15(A)~15(C) respectively show a waveform of the input optical signal of the optical gate 270, the optical gate characteristics of the MZ optical intensity modulator 274, and an output waveform of the optical gate 270. By this optical gate operation, the optical gate 270 can improve the signal to noise ratio and the extinction ratio of the input optical pulse signal. Although the noise still remains in the space (the signal '0' part), the noise can be removed if the operation bias voltage of the EA modulator 236 in the second wavelength converter 230 is properly adjusted. The reason is because absorption loss characteristics of the EA modulator against the bias voltage (the reverse bias voltage) compresses the noise in the space part proportional to the depth of the bias voltage, as shown in FIG. 16 (see Edagawa et al, OFC '97, TuO 5, pp. 77–78, 1997). In FIG. 16, the vertical and horizontal axes show respectively transmission rate and the intensity of input light.

As the MZ optical intensity modulator 274 used for the optical gate operation can use a narrow band width clock signal for modulation without requiring the wide bandwidth modulation characteristics, it can be obtained easily and inexpensive. The MZ modulator that can be used for this purpose is for example a modulator comprising a $LiNbO_3$ (lithium niobate) optical waveguide.

Because the phase controller 278 is disposed, it becomes possible that the optical gate operation can automatically follow the jitter fluctuation of the input optical pulse. The jitter generated in the all-optical regenerator can be also absorbed, if a phase controller similar to the phase controller 278 is disposed in the second wavelength converter 230 for controlling the amount of the phase shift by the phase shifter 248 so that the average power of the output light of the EA modulator 240 becomes the maximum.

Figure 17:
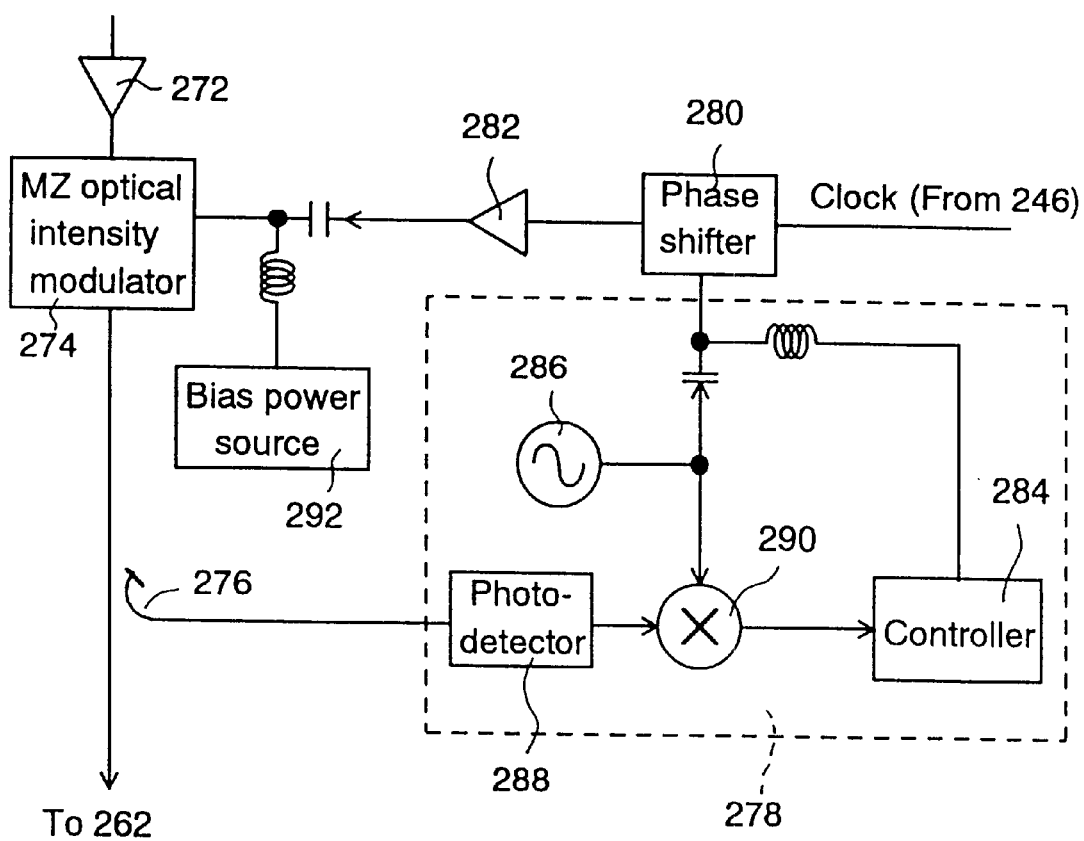
FIG. 17 is a block diagram of a phase controller 278.
Figure 18:
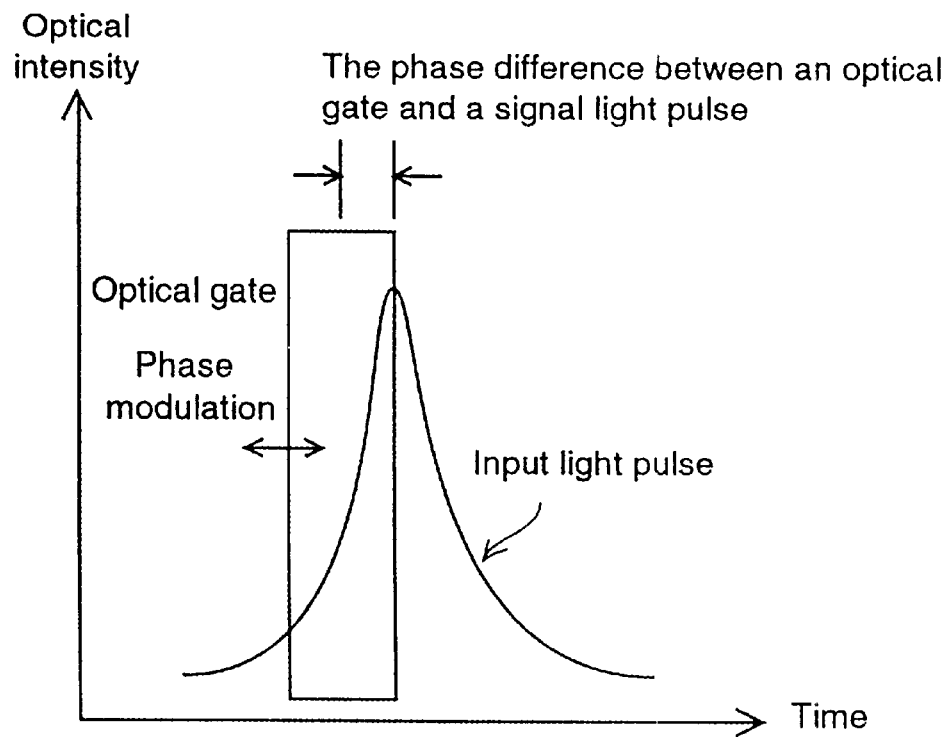
FIG. 18 is a diagram showing the relation between an optical gate and an input optical pulse at the MZ optical intensity modulator 274.

FIG. 17 shows a schematic block diagram of the phase controller 278. The controlling circuit 284 outputs the phase error signal for controlling the amount of the phase shift by the phase shifter 280. A low frequency oscillator 286 oscillates at an extremely low frequency, for example at a several kHz, compared to a bit rate of the transmission optical pulse. The output of the low frequency oscillator 286 and the error signal output from the controlling circuit 284 are added and applied to the control input of the phase shifter 280. By this operation, the phase shifter 280 shifts the phase of the clock signal from the clock extracting circuit 246 according to the amount specified by the error signal and modulates (dithers) the clock with the output frequency of the low frequency oscillator 286. The clock phase-shifted and phase-modulated by the phase shifter 280 is amplified by the amplifier 282 and applied to the MZ optical intensity modulator 274 after being biased by the bias voltage output from the bias power supply 292. The relation of the optical gate and the input optical pulse in the MZ optical intensity modulator 274 is shown in FIG. 18. The timing of the optical gate fluctuates according to the oscillation frequency of the low frequency oscillator 286.

Figure 19:
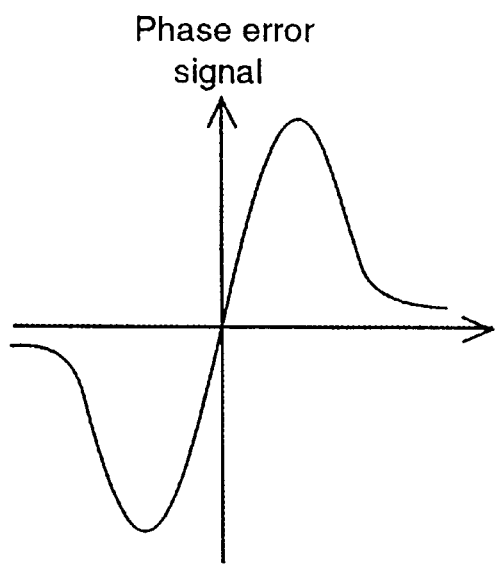
FIG. 19 shows a diagram of the phase discrimination characteristics in the configuration shown in FIG. 17.

As described above, one portion of the output light of the MZ optical intensity modulator 274 is split by the divider 276 and enters a low speed photodetector 288 in the phase controller 278. The photodetector 288 converts the optical pulse from the divider 276 into an electric pulse and supplies it to a mixer 290. The mixer 290 is applied by the output of the low frequency oscillator 286. The mixer 290 multiplies both inputs, synchronously detects (locking-in detects) the modulation signal introduced at the phase shifter 280, and supplies the detecting result to the controlling circuit 284. By this locking-in detection, as shown in FIG. 19, the phase discriminating characteristics can be obtained according to the difference between the average phase of the optical gate and the optical pulse phase. The controlling circuit 284 generates the above mentioned phase error signal for changing the phase shift amount of the phase shifter 280 toward the direction so that the input optical pulse enters in the optical gate in the MZ optical intensity modulator 274 in accordance with the output of the mixer 290 and applies it to the phase shifter 280.

When such an automatic phase controlling loop is employed, the phase shift amount of the phase shifter 280 can be automatically adjusted so that the phase error signal is locked to approximately zero. The range of the control bandwidth is sufficient if it covers the bandwidth of the jitter to be occurred on the transmission line. In this structure, even if the optical intensity of the input optical pulse fluctuates, as long as it is a single peak optical pulse, the stable automatic phase control can be obtained. However, if the phase displacement amount by the modulation signal output from the low frequency oscillator 286 is excessive, the intensity fluctuation noise occurs in the output light of the MZ optical intensity modulator 274 and deteriorates the signal quality. Therefore, the amplitude of the modulation signal preferably should be kept to the minimum within a necessary condition.

When the EA modulator is used instead of the MZ optical intensity modulator 274, if the phase of the optical gate shifts against the signal light pulse, as explained in the Heisei 9 nen (1997) Japanese patent application No. 189748, (one portion of) the signal light is absorbed and the photocurrent flowing the electrode of the modulator is increased. By utilizing this function, also a similar automatic phase control can be realized.

The optical gate 270 can be applied to the respective embodiment shown in FIGS. 1, 6 and 10.

In FIGS. 6 and 7, optical amplifiers (EDFA) are not shown among the elements. However, as a practical matter, optical amplifiers are inserted at the positions corresponding to the optical amplifiers 212, 222, 232, and 242 in the embodiment shown in FIG. 10. It is obvious that at the points where optical level is sufficient, the optical amplifiers become unnecessary.

In the above embodiments, the signal light and the probe light are inputted into the wavelength converting elements, namely the EA modulators 36, 146, 166, 218 and 236 so that the signal light and the probe light propagate in the mutually opposite directions in the wavelength converting elements. However, it is also possible to modify that the signal light and the probe light propagate in the same direction.

Figure 20:
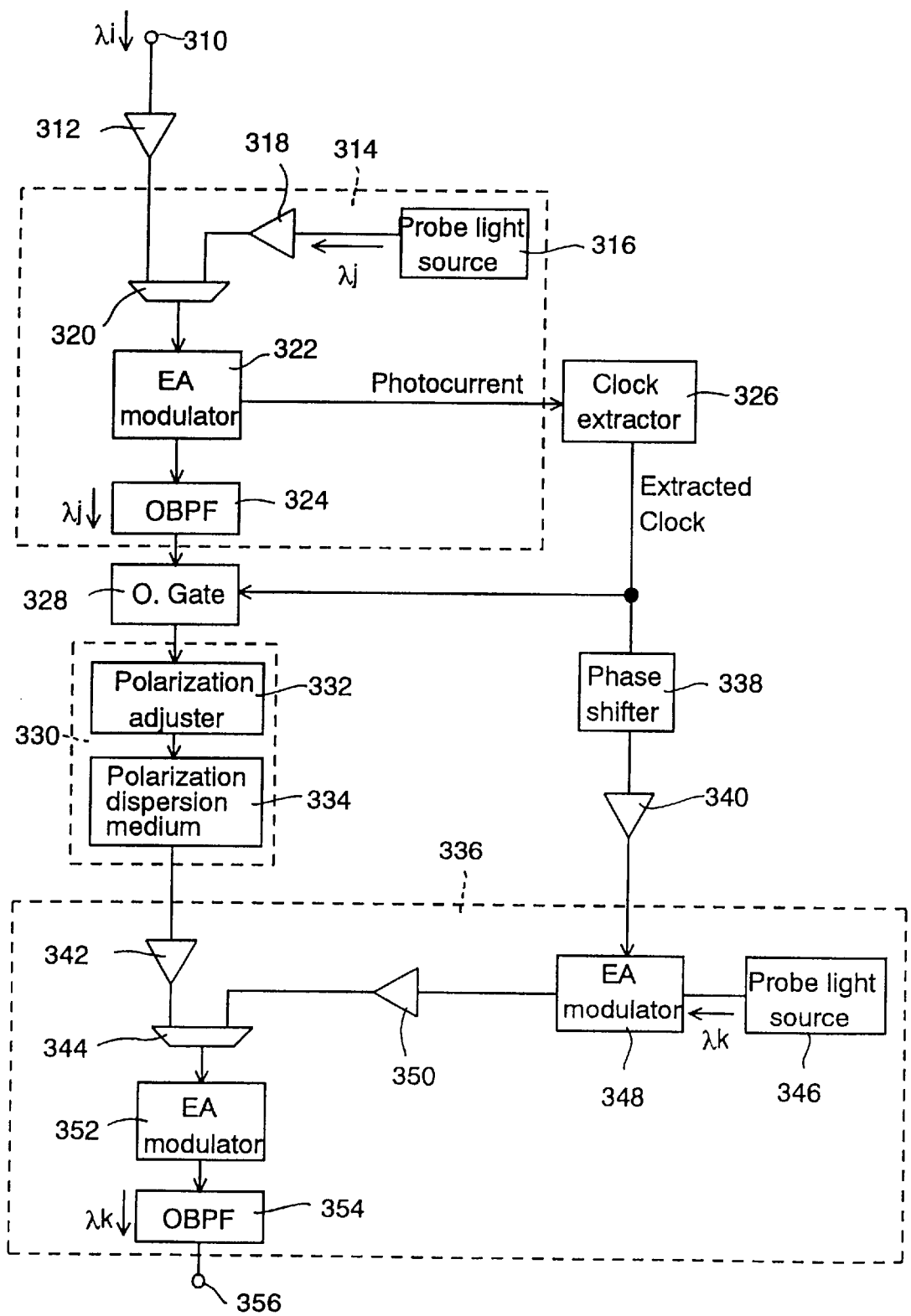
FIG. 20 shows a schematic block diagram of a modified embodiment in which a signal light and a probe light propagate in the same direction in a wavelength converting element.

FIG. 20 shows a modified schematic block diagram of the embodiment shown in FIG. 13 in which the signal light and the probe light propagate in the same direction in a wavelength converting element. An RZ optical pulse signal of a wavelength $\lambda i$ from the trunk system enters an optical input terminal 310. The RZ optical pulse having inputted the optical input terminal 310 is optically amplified by an EDFA 312 and then enters a first wavelength converter 314.

Figure 21:
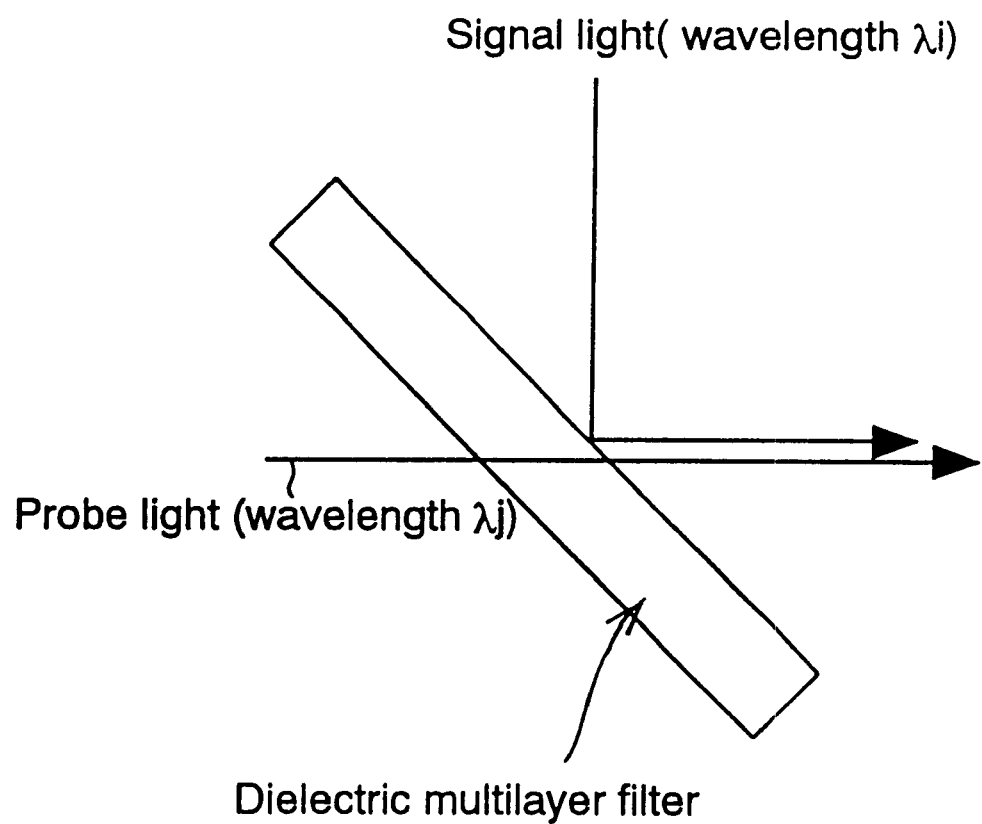
FIG. 21 shows an illustration of the configuration of a WDM coupler 320.

In the first wavelength converter 314, a probe light source 316 generates a probe light having a narrow spectral single wavelength $\lambda j$, which is different from the wavelength $\lambda i$ of the input signal light. The output light from the probe light source 316 is optically amplified by an EDFA 318 and enters a WDM coupler 320. The output light of the EDFA 312 also inputs the WDM coupler 320 and the WDM coupler 320 multiplexes both incident lights and supplies the multiplexed light to an EA modulator 322. The WDM coupler 320 comprises for example a dielectric multilayer filter as shown in FIG. 21. It is capable of multiplexing the signal light and the probe light at an insertion loss of between 1 and 2 dB. Though a fiber coupler can be also employed as the WDM coupler 320, it brings a branching loss of not less than 3 dB.

The EA modulator 322, similarly to the EA modulators 36, 146 and 218, is also applied by a constant DC voltage. In the EA modulator 322, the RZ optical pulse of the wavelength $\lambda i$ and the CW probe light of the wavelength $\lambda j$ propagate in the same direction. While they propagate in the EA modulator 322, the optical intensity of the probe light of the wavelength $\lambda j$ reflects the optical intensity change of the RZ optical pulse of the wavelength $\lambda i$ and the wavelength of an optical carrier conveying the signal is converted from $\lambda i$ to $\lambda j$.

An optical band pass filter 324 exclusively extracts a wavelength $\lambda j$ component from the output light (the original signal light of the wavelength $\lambda i$ and the probe light of the wavelength $\lambda j$) of the EA modulator 322. The output light of the optical band pass filter 324 becomes the output light of the first wavelength converter 314. Since the output light of the EA modulator 322 includes both original signal light of the wavelength $\lambda i$ and probe light of the wavelength $\lambda j$, the wavelength converter 314 necessarily must comprises the optical band pass filter 324 at its output stage.

The EA modulator 322, similarly to the EA modulators 36, 146 and 218, also generates photocurrent in accordance with the intensity change of the incident lights (concretely, the intensity change of the original signal light of the wavelength $\lambda i$) from its electrode. The generated photocurrent is applied to a clock extracting circuit 326. The clock extracting circuit 326, similarly to the clock extracting circuit 246, extracts and regenerates clock components from the input photocurrent.

The output light (of the optical band pass filter 324) of the wavelength converter 314 is applied to an optical gate 328. The optical gate 328 comprises the same structure with the optical gate 270 and operates the same way. That is, the optical gate 328 takes out the signal pulse part from the output light of the optical band pass filter 324 according to the clock extracted by the clock extracting circuit 326.

The output light of the optical gate 328 enters an optical pulse stretcher 330. The optical pulse stretcher 330, similarly to the embodiments shown in FIGS. 11 and 13, comprises a polarization adjuster 332 identical with the polarization adjuster 262 and a polarization dispersion medium 334 identical with the polarization dispersion medium 264. The optical pulse stretcher 330 operates equally to the polarization adjuster 262 and the polarization dispersion medium 264 in the embodiments shown in FIGS. 11, 13 and stretches the optical pulse width of the output optical pulse from the optical gate 328 in the time domain. Since the optical pulse stretcher 330 stretches the optical pulse width using the polarization, the optical path between the probe light source 316 and the polarization dispersion medium 334 inevitably needs to be a transmission medium for maintaining a state of polarization.

The output light of the optical pulse stretcher 330 enters a second wavelength converter 336. The clock extracted and outputted by the clock extracting circuit 326 also inputs to the second wavelength converter 336 after being phase-adjusted by a phase shifter 338 and amplified by an amplifier 340.

In the second wavelength converter 336, an EDFA 342 optically amplifies the output light from the optical pulse stretcher 330 and applies it to a WDM coupler 344. A probe light source 346 generates a second probe light of a wavelength $\lambda k$ being different from the wavelength $\lambda j$ of the first probe light. The wavelength $\lambda k$ can be equal to the wavelength $\lambda i$ of the original signal light. The probe light from the probe light source 346 enters an EA modulator 348. The output signal of the amplifier 340 is applied to an electrode of the EA modulator 348. That is, the EA modulator 348 is driven according to the clock output from the clock extracting circuit 326 and converts the probe light output from the probe light source 346 into an RZ pulse by intensity-modulating it. The probe light being converted into the RZ pulse light by the EA modulator 348 is optically amplified by an EDFA 350 and applied to the WDM coupler 344.

The WDM coupler 344 multiplexes the output lights of the EDFAs 342, 350 and applies the multiplexed light to an EA modulator 352. The WDM coupler 344, similarly to the WDM coupler 320, also comprises a dielectric multilayer filter. The EA modulator 352, similarly to the EA modulator 236, is applied by a constant DC voltage. In the EA modulator 352, the output light (comprising the first probe light of the wavelength $\lambda j$) from the optical pulse stretcher 330 and the second probe light of the wavelength $\lambda k$ being converted into the RZ pulsed light by the EA modulator 348 propagate in the same direction. While they are propagating, the second probe pulse light of the wavelength $\lambda k$ is sampled by the output light of the optical pulse stretcher 330. As a result, a wavelength of an optical carrier for conveying the signal is converted from $\lambda j$ to $\lambda k$ and, at the same time, the pulse waveform gets reshaping and the signal pulse gets retiming.

The optical band pass filter 354 exclusively extracts wavelength $\lambda k$ components from the output light (comprising the first probe light of the wavelength $\lambda j$ and the second probe light of the wavelength $\lambda k$) of the EA modulator 352. The output light from the optical band pass filter 354 is output from an output terminal 356 to the outside as the output light of the second wavelength converter 336. Since the output light of the EA modulator 352 includes the components of both wavelengths $\lambda j$ and $\lambda k$, the wavelength converter 336 necessarily must comprise the optical band pass filter 354 at its output stage.

Propagating the signal light and probe light in the same direction is applicable to the other embodiments, namely to each embodiment shown in FIGS. 1, 6, 7 and 11.

The WDM coupler 344, similarly to the WDM coupler 320, also comprises a dielectric multilayer filter as shown in FIG. 21.

In the above embodiments, it is preferable to automatically control their phase adjusting amount of the phase shifter 44, 172, 248 and 338. For instance, it is sufficient if phase controlling circuits are disposed to the outside, which can automatically control the phase adjusting amount of the phase shifters 44, 172, 248 and 338 in accordance with the output lights from the output terminals 58, 176, 254 and 356. The structure of the phase controlling circuits can be the same with the phase controlling circuit 278.

As can be readily understood from the foregoing descriptions, according to this invention, a signal light can be regenerated in an intact optical state and get retiming and reshaping using relatively a fewer elements. Also, the costs can be reduced since there is no need to employ costly high-speed photodiodes. The reliability improves because the number of elements can be reduced. Furthermore, according to the invention, it becomes tolerant to the jitter and, therefore, the signal to noise ratio and the extinction ratio are improved and the missing signals are effectively prevented.

What is claimed is:

1. An optical digital regenerator for digitally regenerating an input signal light in an intact optical state, comprising:
    a first optical operating unit having a first probe light generator for generating a first probe light and a first optical operator for converting a waveform of the first probe light output from the first probe light generator according to an optical intensity waveform of the input signal light;
    a clock extractor for extracting a clock component of the input signal light from a photocurrent generated by the first optical operator; and
    a second optical operating unit having a second probe light generator for generating a second probe light being pulsed in accordance with the extracted clock output from the clock extractor and a second optical operator for sampling the second probe pulse light output from the second probe light generator according to output light from the first optical operating unit.

2. The optical digital regenerator of claim 1 wherein the first probe light generated from the first probe light generator comprises a CW light.

3. The optical digital regenerator of claim 1 wherein the first optical operator comprises an EA modulator having a predetermined DC bias applied thereto.

4. The optical digital regenerator of claim 1 wherein the clock extractor comprises a phase adjuster for phase-adjusting the extracted clock.

5. The optical digital regenerator of claim 1 wherein the first optical operating unit further comprises a first extractor for extracting the output light from the first optical operator and outputting it, and the second optical operating unit further comprises a second extractor for extracting output light from the second optical operator and outputting it.

6. The optical digital regenerator of claim 1 wherein the wavelength of the first probe light is different from the wavelength of the input signal light.

7. The optical digital regenerator of claim 1 or 6 wherein the wavelength of the second probe light generated by the second probe light generator is different from the wavelength of the first probe light generated by the first probe light generator.

8. The optical digital regenerator of claim 1 further comprising an optical pulse stretcher disposed between an output of the first optical operating unit and an input of the second optical operating unit for stretching a pulse width of an optical pulse of the output light from the first optical operating unit, the optical pulse stretcher comprising a divider for dividing the output light from the first optical operating unit into two portions and multiplexing them after the two divided lights have propagated on different optical paths.

9. The optical digital regenerator of claim 1 further comprising an optical pulse stretcher disposed between an output of the first optical operating unit and an input of the second optical operating unit for stretching a pulse width of an optical pulse of the output light from the first optical operating unit, the optical pulse stretcher comprising a high dispersion medium.

10. The optical digital regenerator of claim 1 further comprising an optical pulse stretcher disposed between an output of the first optical operating unit and an input of the second optical operating unit for stretching a pulse width of the an optical pulse of the output light from the first optical operating unit, the optical pulse stretcher comprising a chirped grating fiber and an optical circulator for supplying input light to the chirped grating fiber and outputting reflected light from the chirped grating fiber.

11. The optical digital regenerator of claim 9 or 10 wherein the first probe light generator comprises a probe light source for outputting the first probe light, and a phase modulator for phase-modulating the first probe light output from the probe light source according to the clock extracted by the clock extractor.

12. The optical digital regenerator of claim 8, 9 or 10 wherein the first probe light generator comprises at least one of an incoherent light generator and a multi wavelength light generator.

13. The optical digital regenerator of claim 1 further comprising an optical pulse stretcher disposed between an output of the first optical operating unit and an input of the second optical operating unit for stretching a pulse width of an optical pulse of the output light from the first optical operating unit, the optical pulse stretcher comprising media having mutually orthogonal polarization directions and different propagation characteristics.

14. The optical digital regenerator of claim 1 further comprising an optical gating unit disposed between an output of the first optical operating unit and an input of the second optical operating unit for optically gating the output light from the first optical operating unit according to the extracted clock output from the clock extractor.

15. The optical digital regenerator of claim 14 wherein the optical gating unit comprises a phase controller for automatically adjusting the phase of the extracted clock output from the clock extractor.

16. The optical digital regenerator of claim 14 wherein the optical gating unit comprises an optical gating element for optically gating the output light of the first optical operating unit, a phase shifter for shifting the phase of the extracted clock output from the clock extractor, a photodetector for converting output light of the optical gating element into an electric signal, and a controller for controlling the amount of phase shift by the phase shifter according to the electric signal output from the photodetector.

17. An optical digital regenerator for digitally regenerating an input signal light in an intact optical state, comprising:
a first optical operating unit having a first probe light generator for generating a first probe light, the first optical operating unit copying a waveform of the input signal light onto the first probe light;
an optical pulse stretcher for stretching a pulse width of light output from the first optical operating unit, the optical pulse stretcher comprising a divider for dividing the light output from the first optical operating unit into two portions and multiplexing them after the two divided lights have propagated on different optical paths;
a second optical operating unit having a second probe light generator for generating a second probe light, the second optical operating unit sampling the second probe light output from the second probe light generator using output light of the optical pulse stretcher; and
a clock extractor for extracting a clock component contained in the input signal light, and wherein at least one of the first and second probe light generators outputs its respective probe light being pulsed according to the extracted clock output of the clock extractor.

18. The optical digital regenerator of claim 17 wherein the second probe light generator generates the second probe light being pulsed according to the extracted clock output of the clock extractor.

19. The optical digital regenerator of claim 17 wherein the wavelength of the first probe light is different from the wavelength of the input signal light, and the wavelength of the second probe light is different from that of the first probe light.

20. An optical digital regenerator for digitally regenerating an input signal light in an intact optical state, comprising:
a first optical operating unit having a first probe light generator for generating a first probe light, the first optical operating unit copying a waveform of the input signal light onto the first probe light;
an optical pulse stretcher for stretching a pulse width of light output from the first optical operating unit, the optical pulse stretcher comprising high dispersion media;
a second optical operating unit having a second probe light generator for generating a second probe light, the second optical operating unit sampling the second probe light output from the second probe light generator using output light of the optical pulse stretcher; and
a clock extractor for extracting a clock component contained in the input signal light, and wherein at least one of the first and second probe light generators outputs its respective probe light being pulsed according to the extracted clock output of the clock extractor.

21. The optical digital regenerator of claim 20 wherein the second probe light generator outputs the second probe light being pulsed according to the extracted clock output of the clock extractor.

22. The optical digital regenerator of claim 20 wherein the wavelength of the first probe light is different from the wavelength of the input signal light, and the wavelength of the second probe light is different from that of the first probe light.

23. The optical digital regenerator of claim 20 wherein the high dispersion medium comprises a chirped grating fiber, and the optical pulse stretcher further comprises an optical circulator for supplying input light to the chirped grating fiber and outputting reflected light from the chirped grating fiber.

24. The optical digital regenerator of claim 20 wherein the first probe light generator comprises a probe light source for outputting the first probe light, and a phase modulator for phase-modulating the first probe light output from the probe light source according to the clock extracted by the clock extractor.

25. The optical digital regenerator of claim 20 wherein the first probe light generator comprises at least one of an incoherent light generator and a multi wavelength light generator.

26. An optical digital regenerator for digitally regenerating an input signal light in an intact optical state, comprising:
- a first optical operating unit having a first probe light generator for generating a first probe light, the first optical operating unit copying a waveform of the input signal light onto the first probe light;
- an optical pulse stretcher for stretching a pulse width of light output from the first optical operating unit, the optical pulse stretcher comprising media with mutually orthogonal polarization directions and different propagation characteristics;
- a second optical operating unit having a second probe light generator for generating a second probe light, the second optical operating unit sampling the second probe light output from the second probe light generator using output light of the optical pulse stretcher; and
- a clock extractor for extracting a clock component contained in the input signal light, and wherein at least one of the first and second probe light generators outputs its respective probe light being pulsed according to the extracted clock output of the clock extractor.

27. The optical digital regenerator of claim 26 wherein the second probe light generator outputs the second probe light being pulsed according to the extracted clock output of the clock extractor.

28. The optical digital regenerator of claim 26 wherein the wavelength of the first probe light is different from the wavelength of the input signal light, and the wavelength of the second probe light is different from that of the first probe light.

29. An optical digital regenerator for digitally regenerating an input signal light in an intact optical state, comprising:
- a clock extractor for extracting a clock component contained in the input signal light;
- a first optical operating unit having a first probe light generator for generating a first probe light, the first optical operating unit copying a waveform of the input signal light onto the first probe light;
- an optical gating unit for optically gating output light of the first optical operating unit according to the extracted clock output from the clock extractor;
- an optical pulse stretcher for stretching a pulse width of light output from the optical gating unit; and
- a second optical operating unit having a second probe light generator for generating a second probe light, the second optical operating unit sampling the second probe light output from the second probe light generator using light output of the optical pulse stretcher, and wherein at least one of the first and second probe light generators outputs its respective probe light being pulsed according to the extracted clock output of the clock extractor.

30. The optical digital regenerator of claim 29 wherein the optical gating unit comprises a phase controller for automatically adjusting the phase of the extracted clock output from the clock extractor.

31. The optical digital regenerator of claim 29 wherein the optical gating unit comprises an optical gating element for optically gating the output light of the first optical operating unit, a phase shifter for phase-shifting the extracted clock output from the clock extractor, a photodetector for converting output light of the optical gating element into an electric signal, and a controller for controlling the amount of the phase shift by the phase shifter according to the electric signal output from the photodetector.

* * * * *